(12) United States Patent
Anand et al.

(10) Patent No.: US 7,266,703 B2
(45) Date of Patent: Sep. 4, 2007

(54) SINGLE-PASS CRYPTOGRAPHIC PROCESSOR AND METHOD

(75) Inventors: Satish N. Anand, Chandler, AZ (US); Hemanshu Bhatnagar, Phoenix, AZ (US); Swaroop Admusumilli, Chandler, AZ (US); James Darren Parker, Tempe, AZ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 766 days.

(21) Appl. No.: 10/144,004

(22) Filed: May 13, 2002

(65) Prior Publication Data
US 2002/0191790 A1   Dec. 19, 2002

Related U.S. Application Data

(60) Provisional application No. 60/297,877, filed on Jun. 13, 2001, provisional application No. 60/339,884, filed on Dec. 10, 2001.

(51) Int. Cl.
H04L 9/32 (2006.01)
H04L 9/00 (2006.01)
H04K 1/00 (2006.01)

(52) U.S. Cl. .............. 713/189; 713/168; 713/161; 380/28; 380/255

(58) Field of Classification Search .............. None
See application file for complete search history.

(56) References Cited

U.S. PATENT DOCUMENTS 5,592,556 A * 1/1997 Schwed ............ 380/274
5,708,659 A * 1/1998 Rostoker et al. ............ 370/392
5,959,689 A   9/1999 De Lange et al. .......... 348/571
6,021,201 A   2/2000 Bakhle et al.

(Continued)

FOREIGN PATENT DOCUMENTS

EP   1 191 736 A2   3/2002

(Continued)

OTHER PUBLICATIONS

Touch, J.D.: "Performance Analysis of MD5" Computer Communications Review, Association for Computing Machinery. New York, US, vol. 25, No. 4, Oct. 1, 1995, pp. 77-86.

(Continued)

Primary Examiner—Ayaz Sheikh
Assistant Examiner—Arezoo Sherkat
(74) Attorney, Agent, or Firm—RatnerPrestia

(57) ABSTRACT

A cryptographic processing system includes a cipher circuit and hash circuit. An input control unit and output control unit work together to process data packets in a pipelined manner wherein the data packets move through the processing system in a single-pass. The input control unit manages data received from a read interface and the initiation of cipher processing of the data in the cipher circuit. The output control unit manages data output to a write interface and the hash processing of the data in the hash circuit. Data moves through the cipher circuit in clear data and cipher data form so that the output control unit may selectively send clear data and/or cipher data to the hash circuit and to an output FIFO memory buffer, which handles final processing under the control of the output control unit prior to sending fully processed data to the write interface.

59 Claims, 8 Drawing Sheets

U.S. PATENT DOCUMENTS

| | | | |
|---|---|---|---|
| 6,028,939 | A | 2/2000 | Yin |
| 6,044,451 | A | 3/2000 | Slavenburg et al. .......... 712/24 |
| 6,091,821 | A | 7/2000 | Buer |
| 6,141,422 | A | 10/2000 | Rimpo et al. ................. 380/44 |
| 6,477,646 | B1* | 11/2002 | Krishna et al. ............. 713/189 |
| 2001/0033012 | A1* | 10/2001 | Kommerling et al. ...... 257/679 |
| 2002/0001384 | A1 | 1/2002 | Buer ........................... 380/30 |
| 2002/0078342 | A1* | 6/2002 | Matthews ................... 713/151 |
| 2003/0014627 | A1* | 1/2003 | Krishna et al. ............. 713/153 |

FOREIGN PATENT DOCUMENTS

| | | |
|---|---|---|
| EP | 1191736 | 3/2002 |
| GB | EP 1 191 736 A2 | 3/2002 |
| WO | WO99/14881 | 3/1999 |
| WO | WO 99/14881 | 3/1999 |
| WO | WO-WO99/14881 | 3/1999 |
| WO | WO 01/61912 A1 | 8/2001 |
| WO | WO 01/80483 A2 | 10/2001 |

OTHER PUBLICATIONS

Schneier B: "Secure Hash Algorithm (SHA)" Applied Cryptography. Protocols, Algorithms, and Source Code in C, New York, John Wiley & Sons, US, 1996, pp. 442-445.

"Secure Hash Standard", *Federal Information Processing Standards Publication 180-1 U.S. Department of Commerce*, Technology Administration National Institute of Standards and Technology,(Apr. 17, 1995),24 pgs.

"VMS115; high-speed IPSec coprocessor", *Royal Phillips Electronics*, http://www.us6.semiconductors.com/pip/VMS115-1,(2001),2 pgs.

Anand, Satish.N. ,"Apparatus and Method for a Hash Processing System Using Integrated Message Digest and Secure Hash Architectures", U.S. Appl. No. 10/144,197, filed May 13, 2002, 44 pgs.

Anand, Satish.N. ,"Apparatus and Method for a Hash Processing System Using Multiple Hash Storage Areas", U.S. Appl. No. 10/144,195, filed May 13, 2002, 51 pgs.

Anand, Satish.N. , et al. ,"Security Association Data Cache and Structure", U.S. Appl. No. 10/144,332, filed May 13, 2002, 49 pgs.

Rivest, Ron.L. ,"The MD5 Message-Digest Algorithm", *MIT Laboratory for Computer Science and RSA Data Security, Inc.*, (Apr. 1, 1992),22 pgs.

Schneier, Bruce., "One-Way Hash Functions" *In: Applied Cryptography: protocols, algorithms, and source code; Chapter 18*, (1996). 429-459.

Takahashi, Richard.J. ,"Method and Apparatus for Creating a Message Digest Using a One-Way Hash Algorithm", U.S. Appl. No. 09/880,700, filed Jun. 13, 2001, 26 pgs.

Takahashi, Richard.J. ,"Method and Apparatus for Creating a Message Digest Using a One-Way Hash Algorithm", U.S. Appl. No. 09/880,699, filed Jun. 13, 2001, 35 pgs.

* cited by examiner

Host Command Input
Data Structure (DMA
Mode)

Host Command Input
Data Structure
(Streaming Mode)

Output Data Structure (DMA
and Streaming Modes)

Security Association
Data Structure

CIPHER BLOCK

HASH BLOCK

SINGLE-PASS CRYPTOGRAPHIC PROCESSOR AND METHOD

RELATED APPLICATIONS

This application is a non-provisional application claiming benefit under 35 U.S.C. sec. 119(e) of U.S. Provisional Application Ser. No. 60/297,877, filed Jun. 13, 2001 (titled SINGLE-PASS CRYPTOGRAPHIC PROCESSOR AND METHOD by Satish N. Anand et al.), which is incorporated by reference herein, and of U.S. Provisional Application Ser. No. 60/339,884, filed Dec. 10, 2001 (titled SINGLE-PASS CRYPTOGRAPHIC PROCESSOR AND METHOD by Satish N. Anand et al.), which is also incorporated by reference herein.

BACKGROUND OF THE INVENTION

The present invention relates in general to cryptographic processing systems and, more particularly, to a single-pass architecture and pipelining approach for a cryptographic processing core.

The rapid growth in Internet usage has increased the dependency on information stored and communicated by businesses and individuals. In particular, growth in DSL and cable modem usage by consumers and businesses and increased business-to-business Internet activity such as supply chain management have contributed to this dependency. As the desire for confidentiality, authenticity, and integrity increases, an increasing proportion of this information is sent in secure or encrypted form. Also, as the fiber-optic Internet infrastructure is built to replace older copper-wire or other existing infrastructure, an increasing proportion of Internet communication will occur at giga-bit per second speeds.

Internet communication uses two dominant standard security schemes: IP Security (IPSec) and Secure Sockets Layer (SSL). IPSec is a security protocol from the Internet Engineering Task Force (IETF) that provides authentication and encryption over the Internet. IPSEC is used to secure transmissions in virtual private networks (VPNs), which are used, for example, to connect remote clients within a corporation's intranet or for managing supply chain extranet procurement services between remote servers. It is currently anticipated that encryption processing will increasingly become one of the significant bandwidth bottlenecks in VPNs.

SSL is the leading security protocol on the Internet. When an SSL session is started between a server and a client computer running a browser, the server sends its public key to the browser, which the browser uses to send a randomly-generated secret key back to the server in order to set up a secret key exchange for the session. SSL is incorporated within most Internet browsers, such as the Internet Explorer browser from Microsoft Corporation, to secure financial or other transactions among businesses and consumers. Data-farm and web-hosting businesses are typical users of SSL communications, and improved SSL processing capacity would increase the number of secure transactions that such businesses could support.

Secure communications are desirable for sensitive activities like on-line financial transactions or the transmission of personal medical information, but can require significantly increased processing demands at both ends of a communications session. This processing demand is further increased by the migration to a fiber optic Internet infrastructure, which provides significantly higher communication bandwidth and increases the volume of data for security processing. As the demand for secure Internet communication increases, security processing needs consume ever increasing proportions of the available central processing capability of communications network servers.

Internet communication, including secure communication, is accomplished using standard data packet transmission protocols such as the Internet Protocol (IP). IP communication servers encrypt/decrypt and sign/authenticate inbound and outbound data packets to accomplish typical IP communication. Existing data security and acceleration co-processors work with network server or host central processors to share some of the cryptographic processing load such as, for example, the encrypting, decrypting and authenticating of data packets. However, existing co-processors have several limitations.

First, existing security co-processors handle only one channel of IP packet data, do not support packet pipelining, and do not provide simultaneous support on the same chip for both the IPSec and SSL protocols for several of the most commonly-used encryption and hash algorithms. The foregoing limitations reduce the throughput and efficiency of the co-processor because, without pipelining, portions of the co-processor chip will not be fully utilized for significant time periods. In addition, the lack of multi-channel support limits the modularity and scalability of the co-processor. Further, the lack of support of multiple encryption and hash algorithms requires that the server processor handle the security processing for those packets using encryption or hash protocols not supported by the co-processor. This may place significant packet handling duties on the server processor. For example, existing co-processors do not support both of the widely-used advanced encryption standard (AES) and ARCFOUR encryption algorithms. Accordingly, it is necessary to use more than one security co-processor to handle secure traffic that is expected to regularly use AES and ARCFOUR encryption.

Existing security co-processors also do not provide local access to different records of security association data that can be selected based on the security protocol for the currently-processed data packet. The security association data includes, among other items, the encryption keys necessary for cipher operations. Thus, the server or host processor must use host bus bandwidth to transfer security association data to the co-processor as required for processing data packets.

Another limitation of existing co-processors is that they do not exhibit packet intelligence. In other words, the co-processor is not able to locally vary the security handling of the packet data as appropriate for different security protocols. Instead, the host processor must handle items specific to a particular security protocol such as, for example, the insertion of cipher block padding and Message Authentication Code (MAC) appending for outbound data packets.

An additional limitation of existing co-processors is the use of only a single local packet data memory such as, for example, a single FIFO memory. In some cases, the single memory will become a bottleneck to high security processing throughput because the processing speeds of cipher algorithms have not kept pace with the recent, sudden increase in packet throughput requirements. Further, more than one read access of packet data from the single memory will be required for those security protocols that require the hashing of packet data prior to cipher operations—once for the cipher operation and once to obtain clear data for the hash operation. Moreover, packet data that does not require cipher or hash operations must be read from the single memory after other packet data has completed cipher and/or hash processing because packets are processed one packet at a time.

Hence, there is a need for a cryptographic processor that uses multiple independent packet processing channels, supports both the IPSec and SSL protocols and the most common encryption and hash algorithms on the same chip, and supports packet pipelining for efficient use of the processor. There is a further need for a processor that provides local access to security association data to better use the bus bandwidth between the host processor and the cryptographic processor. Also, there is a need for the processor to recognize the security protocol associated with incoming data packets and to handle certain protocol-specific operations locally on the processor chip without the need for intervention by the host processor. Additionally, there is a need for a processor that reduces local memory bottlenecks associated with existing single memory designs. The processor should accomplish the foregoing while providing improved network transparency (so that, for example, network processors can handle the most common security protocols without additional special processing requirements), maintaining optical-data line transmission rates, and exhibiting improved scalability and compatibility with evolving fiber optic security standards.

DETAILED DESCRIPTION OF THE DRAWINGS

Figure 1:
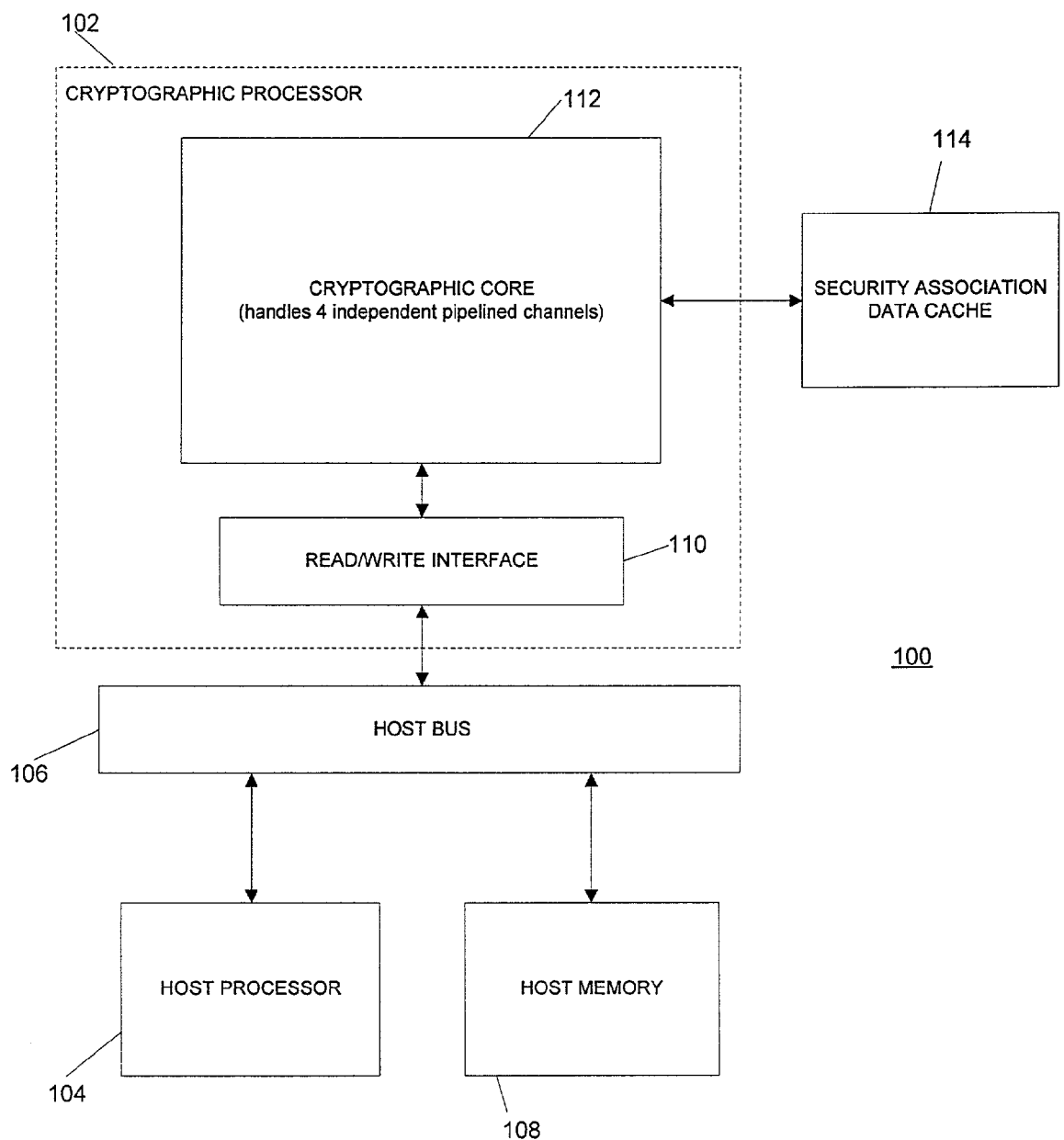
FIG. 1 is a block diagram of the system-level architecture of a cryptographic processing system according to the present invention.

In general, the present invention provides a cryptographic processing system including a cryptographic processor having a cipher circuit for receiving incoming data requiring security processing and a hash circuit coupled to receive data from the cipher circuit. In the cryptographic processor, an input control unit or circuit manages the operation of the cipher block and the receiving of incoming data, and an output control unit or circuit manages the hash block and the sending of processed data.

The incoming data is received by the cryptographic processor, for example, from a host memory through a read/write interface coupled to the cipher circuit. The output control unit sends processed data, for example, to the host memory through the read/write interface. A host computer coupled to the read/write interface initiates the sending of incoming data to the cryptographic processor by sending a processing command to the input control unit. This in turn initiates the fetching of the incoming data from the host memory under the control of the input control unit using a direct memory access interface. Alternatively, incoming data is received through a streaming interface.

According to the present invention, the input control unit and the output control unit are in communication with each other and cooperate to implement the appropriate cipher and hash operations on incoming data packets as appropriate for each packet. The processing command from the host processor includes information about the security protocol associated with each data packet provided for processing.

The input control unit, with assistance from the output control unit, manages packet-to-packet pipelining within the cryptographic processor. According to the present invention, a command buffer is coupled to both the input and output control units to store and share processing commands provided by the host processor. Further, a security association data buffer is coupled to both the input and output control units to store and share security association data used for security processing of each packet.

Also according to the present invention, the security association (SA) data is stored in an SA data cache such as, for example, a memory chip that directly interfaces with the cryptographic processor through a local direct memory access interface. The SA data is read from the data cache under the control of the input control unit and is stored in the SA data buffer.

The cryptographic processor supports, on the same chip, both IPSec and SSL protocols for several common cipher and hash algorithms. According to the present invention, the cryptographic processor architecture handles substantially all incoming data in a single-pass through the processor. The cipher circuit includes a clear data and cipher data register to store clear data at the output of the cipher block that corresponds to the just-processed cipher data. For each byte of processed cipher data, either the corresponding clear data or the cipher data is selectively sent, under control of the input control unit, to the hash block or directly to an output memory for writing to the host memory.

Now discussing an embodiment of the present invention in more detail with reference to the drawings, FIG. 1 is a block diagram of the system-level architecture of a cryptographic processing system 100 according to the present invention. System 100 includes a cryptographic processor 102 coupled to a host processor 104 and a host memory 108 through a host bus 106. Processor 102 includes a cryptographic core 112, which performs cipher and hash operations, and a read/write interface 110, which couples processor 102 to host bus 106. Incoming data requiring security processing may correspond, for example, to inbound or outbound IP packets. Host processor 104 sends a security processing command to processor 102 to initiate security processing for an IP packet. In response, processor 102 fetches the corresponding packet data from host memory 108 using read/write interface 110.

A security association (SA) data cache 114 is coupled to cryptographic core 112. Data cache 114 is, for example, a double data rate synchronous dynamic random access memory (DDR-SDRAM) and stores the SA data that will be used by cryptographic core 112 during cipher and hash processing. Data cache 114 may also include other types of conventional memory devices that are able to store data such as, for example, other types of RAM or hard drive storage devices. The SA data includes, for example, keys, initialization vectors, and a command word. The SA data may be initially loaded into data cache 114, for example, when a secure session is established between host processor 104 and a remote computer (not shown). Then, during the session, as data packets are processed, the appropriate SA data can be accessed by processor 112 locally from data cache 114 rather than requiring repeated access reads through host bus 106, which would reduce the available packet data processing bandwidth. According to the present invention and as described in more detail below, core 112 will select from two or more sets of SA data that have been previously stored in data cache 114 depending on the security protocol applicable for processing the current data packet.

Cryptographic core 112 is designed to handle packets in a pipelined manner. Further, cryptographic core 112 handles, for example, four independent packet processing channels, each of which is pipelined, as discussed in more detail below. It is not necessary that four channels be used, and in other embodiments, a greater or lesser number of independent channels can be used.

Figure 2:
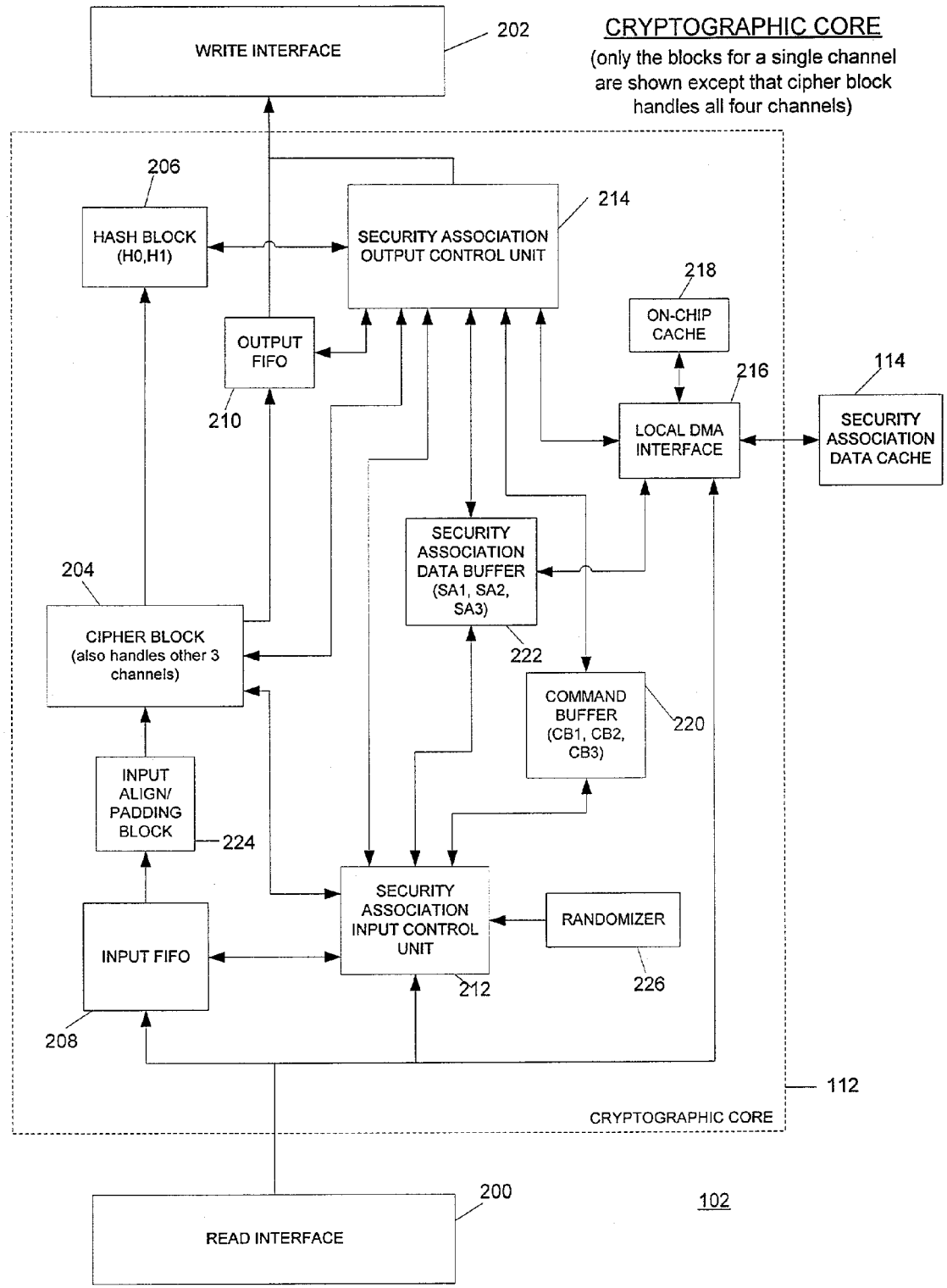
FIG. 2 is a detailed block diagram of a cryptographic processor used in the cryptographic processing system of FIG. 1.
Figure 3:
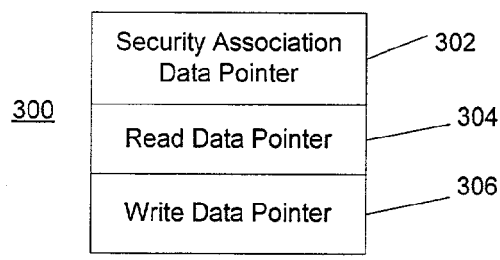
FIGS. 3-6 are schematic diagrams illustrating input, output, and security association data structures used in conjunction with the cryptographic processing system of FIG. 1.

FIG. 2 is a detailed block diagram of cryptographic processor 102. For purposes of simplicity in illustration, FIG. 2 in general, with some exceptions as discussed below, illustrates the architecture of cryptographic processor 112 for a single independent channel of cryptographic core 112. The other three independent channels (not shown) may be handled in a similar manner, as will be recognized by one of skill in the art, and are also coupled to read/write interface 110 and SA data cache 114.

Read/write interface 110 of FIG. 1 is illustrated in FIG. 2, for purposes of illustration and discussion, as read interface 200 and write interface 202, which may be implemented in general as standard DMA or streaming mode interfaces used in a push or pull mode. For example, in a pull mode, read/write interface 110 could be implemented using conventional memory-mapped busses such as PCI, PCIX, Infiniband or LDT. In a push mode, a packet streaming interface with transmit and receive busses can be used such as, for example, a Packet Over Sonet physical level three (POS-PHY3) interface available from PMC Sierra or an SPI4, POS-PHY4 or XGMII interface.

More specifically, read interface 200 is, for example, a standard 32-bit PCI interface or a standard POS-PHY3 or POS-PHY4 Tx streaming interface. Read interface 200, when operating in DMA mode, supports a standard gather mode read from host memory 108. As will be discussed further below, read interface 200 forwards a command request initiated by core 112 to host processor 104 and then returns a command to core 112.

Write interface 202 is, for example, a standard 32-bit PCI interface or a standard POS-PHY3 or POS-PHY4 Rx streaming interface. As described below, core 112 accepts and processes data packets provided from read interface 200 in either a direct memory access (DMA) mode or a streaming mode. Write interface 202, when operating in DMA mode, supports a standard scatter mode write to host memory 108.

Cryptographic core 112 has a cipher circuit 204 (a circuit is sometimes referred to herein as a "block") and a hash circuit or block 206. Cipher block 204 contains several encryption sub-blocks (shown in more detail later) to support conventional AES, ARCFOUR, and triple data encryption algorithm/data encryption standard (TDEA/DES) encryption. Each encryption sub-block handles the four independent channels of core 112.

Hash block 206 includes several sub-blocks for implementing conventional HMAC MD-5 and HMAC SHA-1 algorithms. Hash block 206 also contains two hashing sub-channels H0 and H1, each of which supports message digest 5 (MD5), secure hash algorithm (SHA1), and keyed-hash message authentication code (HMAC) MD5 and HMAC-SHA1 hashing. Thus, according to the present invention, each independent data packet channel of core 112 is associated with two hashing sub-channels H0 and H1 for a total, for example, of eight hashing sub-channels in core 112. In other embodiments, a greater number of hashing sub-channels could be used for each independent data packet channel.

An SA input control unit or circuit 212 generally controls the operation of cipher block 204, and an SA output control unit or circuit 214 generally controls the operation of hash block 206. SA input and output control units 212 and 214 each comprise several finite state machines or controllers for controlling processing within core 112, as described in more detail below.

SA input control unit 212 controls, for example, the programming of cipher block 204 and the identification on a byte-by-byte basis of whether each byte needs cryptographic processing or passes through cipher block 204 without processing as clear data and whether each byte needs hash processing or not, as discussed in more detail below. SA input control unit 212 sends control information to cipher block through, for example, a 64-bit control interface. SA input control unit 212 sends a control word to cipher block 204 indicating the above information, and the control word follows the corresponding data through cipher block 204 for multiplexing of data from output registers in cipher block 204, as described below.

SA output control unit 214 controls, for example, the reading of initialization vector (IV) results and state information from cipher block 204 after cipher processing for a packet is complete for later use, the writing of the IV and state information to SA data cache 114, and the providing of read and write strobes to control the timing of the unloading of data output registers in cipher block 204 and the writing of this data into hash block 206 and an output FIFO memory or buffer (OFIFO) 210. For example, SA output control unit 214 reads the last data word of the packet that is stored in the IV register of TDEA/DES block 706 (see FIG. 7) and stores it in SA data cache 114 for use as an IV for a subsequent chained data packet. SA output control unit 214 also initiates the implementation of MAC addition as used in SSL 3.0 and TLS 1.0 outbound data packets.

SA data cache 114 is coupled to SA data buffer 222, which stores SA data, using a local DMA interface 216. An on-chip memory cache 218 can be used, if desired, to supplement the memory storage available in data cache 114. DMA interface 216 manages the division of memory space between on-chip cache 218 and SA data cache 114. As an alternative to using SA data cache 114, all SA data could be stored in on-chip cache 218, but performance may be limited if storage capacity of an on-chip cache limits the number of security associations that may be used at any given time by a packet. SA input and output control units 212 and 214 are coupled to SA data buffer 222 so that the appropriate encryption and/or hash SA data can be read and loaded into cipher block 204 or hash block 206 prior to processing of an applicable data packet.

Incoming data from read interface 200 is received by input FIFO memory or buffer (IFIFO) 208. IFIFO 208 has a size of, for example, 256 bytes. An input align/padding block 224 receives data from IFIFO 208 and performs standard block alignment and padding to prepare data for the appropriate encryption operations in cipher block 204. Input align/padding block 224 also inserts padding logic for IPSec ESP, SSL 3.0 or TLS 1.0 outbound data packets as appropriate for each standard. IFIFO 208 and input align/padding block 224 are controlled by SA input control unit 212.

Processed data from cipher block 204 is accumulated in output FIFO memory or buffer (OFIFO) 210 after encryption processing for sending to write interface 202. OFIFO 210 is controlled by SA output control unit 214. The data is accumulated in OFIFO 210 as data for the current packet is processed. After all appropriate hash operations are completed for a packet, a MAC digest (for outbound packets only) and status information are appended to the end of the data packet under the control of SA output control unit 214. OFIFO 210 includes output alignment circuitry (not shown) that aligns the data from cipher block 204 before storing it in OFIFO 210. OFIFO 210 has a size of, for example, 256 bytes.

A command buffer 220 stores a command, discussed in more detail below, associated with each data packet being processed in pipelined fashion by core 112. SA input and output control units 212 and 214 are coupled to read commands from command buffer 220 to provide the proper circuit control for each data packet. Command buffer 220 has, for example, three buffers CB1, CB2, CB3, which are used to establish a three-stage packet pipeline for each independent channel of core 112. It should be recalled that core 112 has, for example, four channels, each of which will handle three packets simultaneously in a pipelined manner.

SA data buffer 222 has, for example, three buffers SA1, SA2, and SA3, which hold SA data for the three currently pipelined packets. In other embodiments, the number of command and SA data buffers could be increased or decreased depending on design choices. Command and SA data buffers 220 and 222 may be implemented, for example, using a dual port random access memory (RAM) with one write and read port used by SA input control unit 212 and the other write and read port used by SA output control unit 214.

An optional randomizer 226 provides randomly-generated numbers to SA input control unit 212 as it may request. Randomizer 226 may be of conventional design. Randomizer 226 is used, for example, to generate true random numbers that may be written to a FIFO (not shown) that can be read by host processor 104 for use as cipher keys or initialization vectors (IVs) or for generation of public and private keys in asymmetric ciphers. Randomizer 226 may also be used to provide random numbers that are appended as initialization vectors (IVs) to outbound data packets.

Prior to processing a data packet, host processor 104 (see FIG. 1) may initiate the loading of SA data into SA data cache 114 directly through local DMA interface 216 in preparation for security processing, for example, as part of establishing a secure session with a remote computer. When SA input control unit 212 requests a new command from host processor 104, through read interface 200, to begin data packet processing, the new command contains a pointer, as discussed in more detail below, to the appropriate SA data previously loaded into SA data cache 114 so that the appropriate SA data can be loaded into core 112 for processing the data packet.

As a data packet is processed, as mentioned above, it is written from OFIFO 210 to write interface 202 under control of SA output control unit 214. The command originally obtained from host processor 104 provides, as discussed in more detail below, the location in host memory 108 to which the processed data packet is written.

In addition to each accessing SA data buffer 222 and command buffer 220, SA input and output control units 212 and 214 communicate with one another through finite state machine interfaces to coordinate the handling of pipelined packets. In general, when the pipeline in FIG. 2 is full, SA input control unit 212 will not request a command from host processor 104 for a new packet until SA output control unit 214 sends a signal, as discussed in more detail below, that a previous data packet has been fully written out of OFIFO 210.

After a data packet is fully processed, SA output control unit 214 can update certain SA data in data cache 114, or on-chip cache 218 as appropriate, using local DMA interface 216, as discussed further below. Such an SA data update is done, for example, when the command for the just-processed data packet requires that packet-to-packet chaining be used.

Data Structures

FIGS. 3-6 are schematic diagrams illustrating input, output, and security association data structures used in conjunction with cryptographic processing system 100. When SA input control unit 212 requests a command from host processor 104, the command has a data structure generally illustrated as host command input data structure 300 in FIG. 3. An SA data pointer 302 is an address that points to the SA data stored in data cache 114 corresponding to the incoming packet, a read data pointer 304 points to the source address in host memory 108 of the data packet to be next processed, and a write data pointer 306 points to the destination address in host memory 108 of the fully processed packet.

Figure 4:
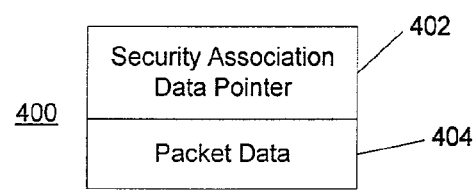

In a streaming mode, the command from host processor 104 has a host command input data structure 400 as illustrated in FIG. 4. An SA data pointer 402 is an address that points to the SA data stored in data cache 114 corresponding to incoming packet data 404.

Figure 5:
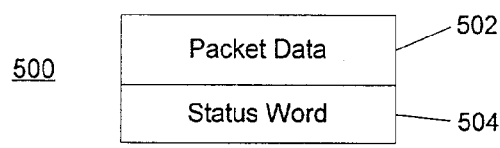

For both DMA and streaming modes, an output data structure 500 is illustrated in FIG. 5. Packet data 502 is processed data written out from read/write interface 110. A status word 504 is appended to packet data 502 and provides information including, for example, whether the packet verification was successful and the result hash digest determined in hash block 206.

Figure 6:
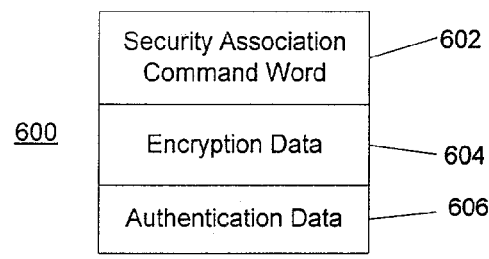

FIG. 6 illustrates a security association data structure 600 having a SA command word 602, encryption data 604, and authentication data 606. Command word 602 identifies, for example, the type of encryption algorithm to use for processing the packet, the type of hash function to use for hashing, and the type of the packet such as, for example, IPSEC Encapsulating Security Payload (ESP) or IPSEC Authentication Header (AH) or SSL 3.0 or TLS 1.0, among others.

For each SA data structure 600, encryption data 604 will contain, for example, the encryption keys and IV for the applicable DES, TDEA, AES or ARCFOUR algorithm. Authentication data 606 contains, for example, the MAC keys for either MD5 or SHA1 algorithms. If an HMAC operation is to be performed, then authentication data 606 further contains inner and outer digests from the first inner and outer hashes, which are obtained form the MAC keys. In other embodiments, SA data would include other information as required to implement other security protocols that may be used in core 112.

Cipher Block

Figure 7:
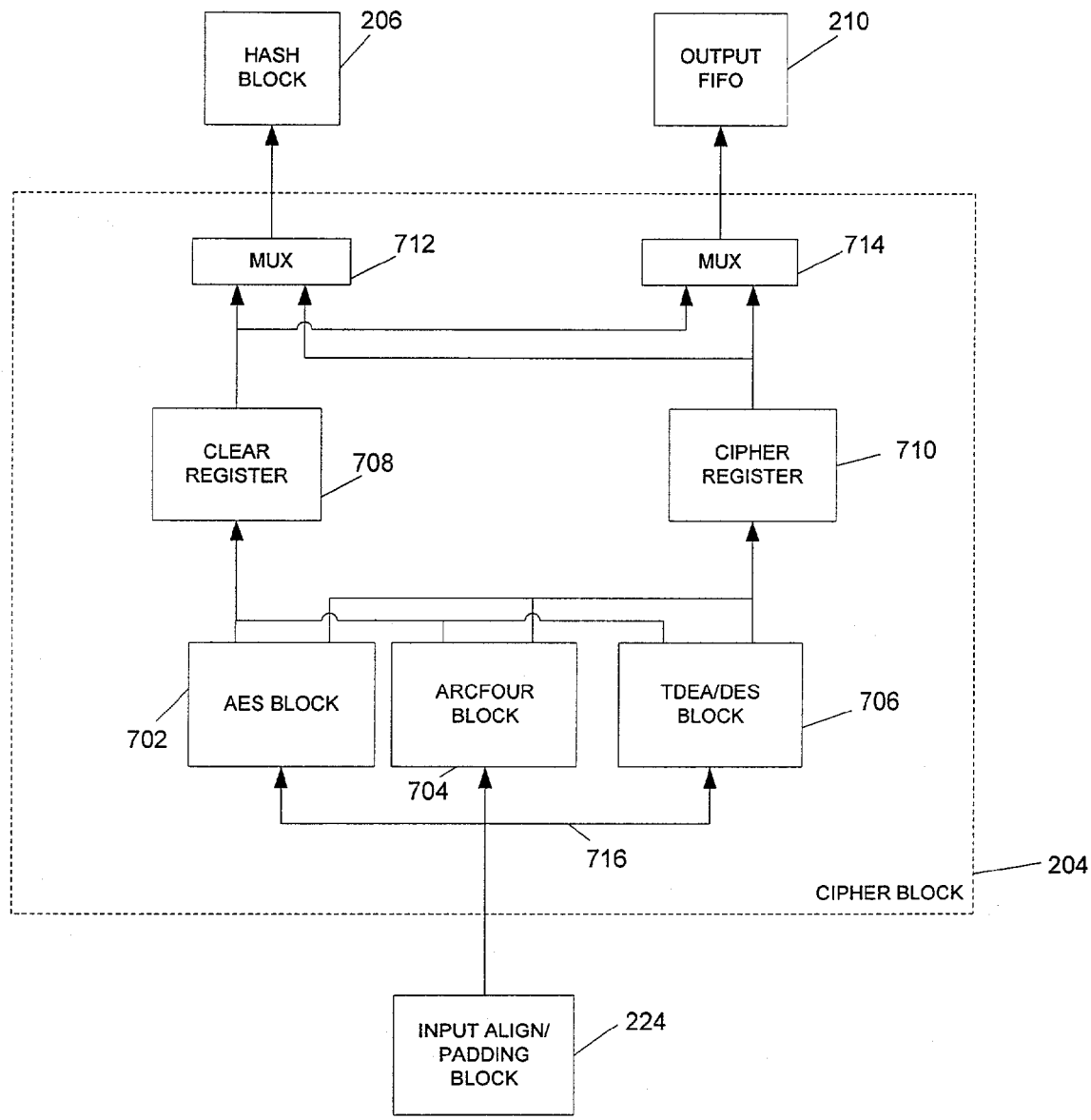
FIG. 7 is a block diagram of a cipher block used in the cryptographic processor of FIG. 2.

FIG. 7 is a block diagram of cipher block 204. Data packets are read from input align/padding block 224 into one of encryption sub-blocks 702-706 depending on the encryption algorithm specified in SA command word 602 (see FIG. 3). SA input control unit 212 loads encryption data 604 into the appropriate sub-block 702-706 in preparation for an incoming data packet, as discussed in more detail below. Data is processed, for example, in 64-bit blocks in cipher block 204.

AES block 702 implements a standard AES algorithm, ARCFOUR block 704 implements a standard ARCFOUR algorithm, and TDEA/DES block 706 implements either a standard DES or TDEA algorithm as may be specified in command word 602. Sub-blocks 702-706 may be implemented using conventional architectures.

According to the present invention, both clear text or data, which is data that is not encrypted or decrypted, and cipher text or data move in tandem or lock-step through cipher block 204 so that either clear data or cipher data are available at the output of cipher block 204 for further processing in hash block 206 or for accumulation in OFIFO 210. The encrypted cipher data output from each of the encryption sub-blocks is stored in a cipher register 710. A clear register 708 stores clear data from each of encryption sub-blocks 702-706. An advantage of the clear data stream and the cipher data stream moving through cipher block 204 in lock-step fashion so that data arrives at the output of cipher block 204 in the same clock cycle is better control and easier selection of t the cipher start and end boundaries.

Another advantage of clear register 708 according to the present invention is that it assists in structuring core 112 to have a single-pass architecture in which data substantially moves in single direction through core 112 rather than being read two or more times from a single input memory as done in prior cryptographic systems. Clear register 708 helps enable a single-pass architecture because sometimes it is necessary to hash clear data rather than encrypted data such as in SSL 3.0 and TLS 1.0 encrypt modes, and sometimes it is necessary to hash encrypted data rather than clear data such as in IPSEC-ESP decrypt mode. It should be noted also that during decrypt mode, the encrypted data flows through the clear register and the decrypted data flows through the cipher register.

A multiplexer 712 and a multiplexer 714 are each coupled to receive clear data and cipher data from registers 708 and 710. Under the control of SA input control unit 212, as discussed in more detail below, multiplexer 712 sends either clear data or cipher data to hash block 206 depending on the security protocol requirements and as indicated in control information passed to cipher block 204 from SA input control unit 212 using command word 602. Specifically, as mentioned above, for each, for example, 64-bit data word that enters cipher block 204 a control word from SA input control unit 212 follows the data word through cipher block 204. The control word indicates which bytes of the data word are to be encrypted to be cipher data or to remained unchanged to be clear data, and which bytes of the data word are to be hashed or not. SA input control unit 212 receives starting address offsets and byte lengths for each data packet received from host processor 104 to use in sending the appropriate control word to cipher block 204. Multiplexer 712 selects to send clear data or cipher data in a byte-by-byte manner for each byte in the 64-bit block using the control word.

Also under the control of SA input control unit 212, multiplexer 714 sends either clear data or cipher data to OFIFO 210 depending on the security protocol requirements indicated in command word 602. Multiplexer 714 selects to send clear data or cipher data in a byte-by-byte manner for each byte in the 64 bit data block.

As mentioned above, cipher block 204 itself supports four independent channels, one channel of which is illustrated in FIG. 2. The data input to cipher block 204 for this illustrated channel is provided by input align/padding block 224. However, cipher block 204 will also receive data from an input align/padding block (not shown), of the same general structure as block 224, for each of the other three channels in core 112.

A common cipher bus or interface 716 accepts packet data from an input align/padding block for one of the four channels of core 112 and routes the data to the appropriate encryption sub-block 702-706 depending on the encryption algorithm specified in command word 602. Cipher bus 716 uses, for example, conventional time division multiplexing to share bus bandwidth. Specifically, command word 602 contains, for example, three control bits that specify the encryption algorithm to be used. These three control bits are written by SA input control unit 212 to the cipher sub-blocks 702, 704, or 706 using memory-mapped addresses for the corresponding encryption sub-block. The selected encryption sub-block uses cipher bus 716 to unload data from input align padding block 224 under control of SA input control unit 212. An advantage of sharing cipher bus 716 is that each encryption sub-block only needs to use bus 716 for a relatively short time period compared to algorithm processing timing.

Each of encryption sub-blocks 702-706 is structured to handle four channels of packet data simultaneously. For example, AES block 702 may use a conventional time division multiplexing approach to handle four channels, one channel of which is that illustrated in FIG. 2. TDEA/DES block 706 may use a conventional four-stage pipelining approach to handle four channels, and ARCFOUR block 704 may use four independent internal channels. Alternatively, TDEA/DES block 706 may also use four independent internal channels as done for ARCFOUR block 704.

More specifically, in one embodiment, TDEA/DES block 706 supports four independent channels simultaneously, for example, by using a four-stage pipeline, with each stage used in a standard time division multiplexed mode. TDEA/DES block 706 uses, for example, a finite state machine (not shown) for each channel to control packet processing. Each channel's state machine operates independently of the other state machines so that each state machine could be at any stage of the DES or TDEA algorithm. Each channel has storage for its IV data and generates keys for different stages of the DES algorithm.

According to the present invention, each channel in TDEA/DES block 706 has two pipelines, one for clear data and the other for cipher data, which move in lock-step through TDEA/DES block 706 (i.e., the clear data and cipher data are loaded at the same time from cipher bus 716 and are unloaded from clear and cipher registers 708 and 710 at the same time). For example, clear data and cipher data are stored as a 64-bit word in an input register in each encryption sub-block (not shown) when entering cipher block 204. Those bytes of the data word that are indicated as clear data are simply passed through the respective encryption sub-block to the clear and cipher output registers 708 and 710. It is an advantage that the clear and cipher data move in such lock-step manner so that internal control circuitry of cipher block 204 is simplified and the flexibility to incorporate new encryption sub-blocks is enhanced. Since different algorithms use a varying number of clock cycles, having clear data waiting at the output register for the corresponding cipher data frees the input register to accept the next data word.

TDEA/DES block 706 is also configured to use IV data that may be embedded LIS; in a data packet, as may be indicated by a control signal from SA input control unit 212 from its decoding of the applicable command word 602 for the data packet. TDEA/DES block 706 is further configured to insert an IV in the data packet.

ARCFOUR block 704 supports four independent channels simultaneously with each channel controlled, for example, by a finite state machine. Each channel has a memory (not shown) in block 704 for storing its state and key values. According to the present invention, there are two pipelines in ARCFOUR block 704, one for clear data and the other for cipher data. Loading and unloading of the clear and cipher pipelines for each channel is done at the same time similarly to TDEA/DES block 706.

AES block 702 supports four independent channels in which, for example, a single finite state machine controls an AES cipher engine (not shown) that operates on each channel in a round-robin manner. AES block 702 is configured to support standard ECB or CBC modes of operation, and the block size and key size of the AES cipher engine is programmable to be 128, 192, or 256 bits. Each channel has a memory (not shown) in block 702 to store its IV, key, and control register values. AES block 702 is configured to use a pre-unrolled decryption key for faster decryption. AES block is also configured to perform key expansion, and the expanded key can be stored in data cache 114 under control of SA output control unit 214.

According to the present invention, there are two pipelines in AES block 702, one for clear data and the other for cipher data. Loading and un-loading of the clear and cipher pipelines is done at the same time similarly as described for the other encryption sub-blocks above.

As described above, and according to the present invention, cipher block 204 uses common input and output interfaces even though the encryption sub-blocks 702-706 use varying internal architectures like pipelining and time division multiplexing. In other words, the signal names at the input and output interfaces are identical regardless of the algorithm used for packet processing. An advantage of a such common interfaces to cipher block 204 is the easier addition of new cipher algorithms, which may be either a stream or a block cipher.

Security Association Input Control Unit

Figure 8:
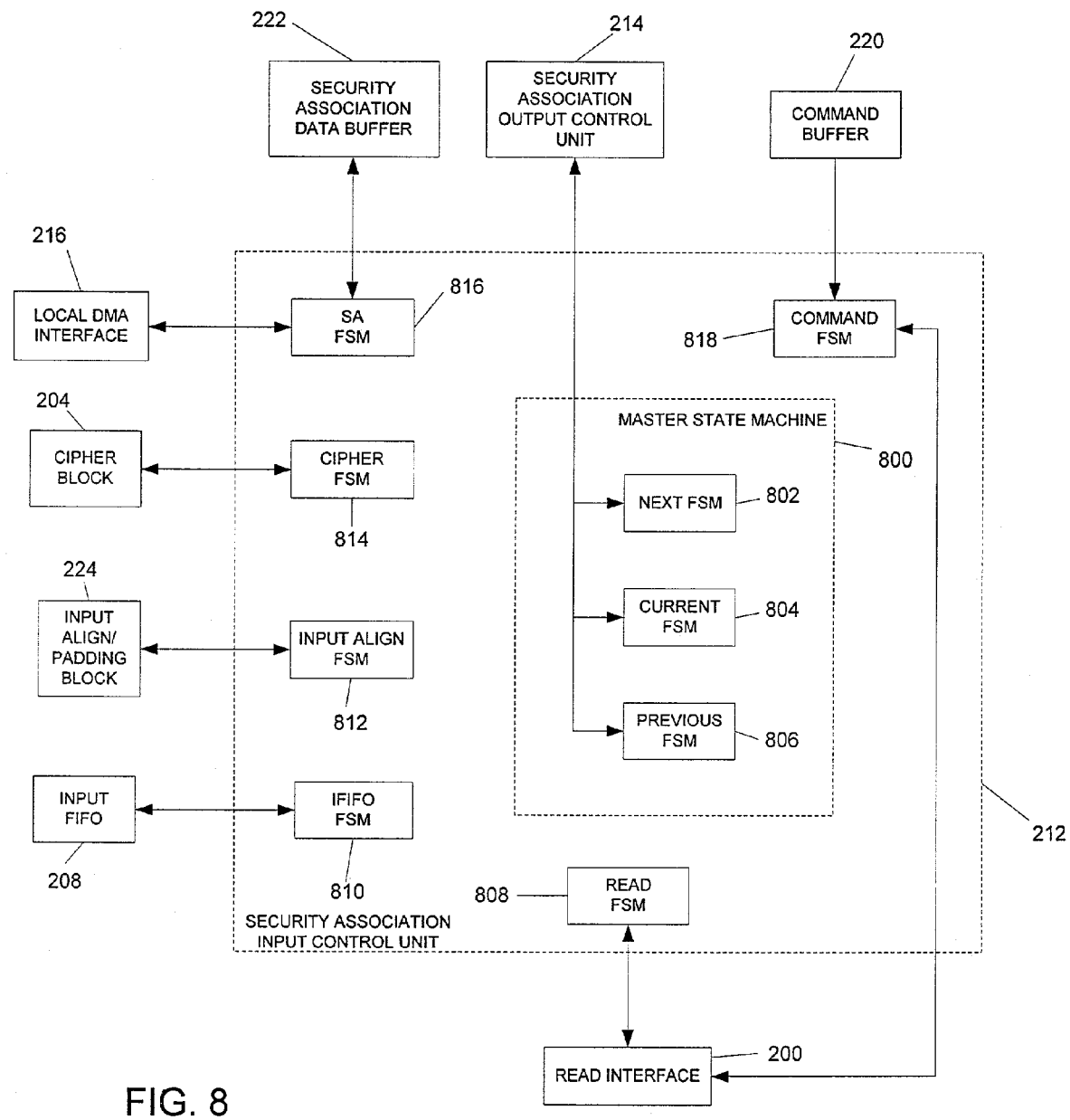
FIG. 8 is a block diagram of an input control unit used in the cryptographic processor of FIG. 2.

FIG. 8 is a block diagram of SA input control unit 212, which generally contains controllers or finite state machines (FSMs) and registers (not shown) configured to control the operation of the input side of cryptographic core 112. More specifically, a master state machine 800 includes, for example, three controllers or FSMs 802-806 for controlling three-stage pipelining of data packets in core 112. The skilled artisan will recognize that a greater or lesser number of FSMs could be used in other designs. Each of FSMs 802-806 is of substantially identical structure and configured to interact with the other portions of core 112 as necessary to control processing of its corresponding pipelined packet. In FIG. 8, FSMs 802-806 are indicated as Next FSM 802, Current FSM 804, and Previous FSM 806 for purposes of discussion and illustration. In actual practice, each of FSMs 802-806 enters in turn a "next", "current", and "previous" state, as discussed below. However, only one FSM is in a "current" state at any given time.

For the example of a single independent channel as illustrated in FIG. 2, the "next", "current", and "previous" states correspond to the extent of processing of a corresponding data packet moving through core 112. Generally, a "next" state corresponds to Next FSM 802 controlling the receipt of a new host command and its associated packet data. A "current" state corresponds to Current FSM 804 controlling the processing of a data packet in cipher block 204, and a "previous" state corresponds to Previous FSM 806 monitoring the completion of a data packet that is completing processing in the output portions of core 112 under the control of SA output control unit 214.

Master state machine 800 is coupled to several interface FSMs that control communication with other circuit portions of core 112. A command FSM 818 couples to read interface 200 and initiates the reading of a new host command from host processor 104. More specifically, Next FSM 802 initiates the sending by command FSM 818 of, for example, an address request signal to read interface 200. In response, command FSM 818 receives an address in host memory 108 corresponding to host command input data structure 300 and a byte count for the corresponding data packet to be loaded from host memory 108. Alternatively, command FSM 818 may receive a host command input data structure 400.

SA FSM 816 uses SA data pointer 302 from host command data structure 300 or 400 to control the reading of a new SA command word 602 from SA data cache 114 using local DMA interface 216. Command word 602 is written to SA buffer 222 under control of SA FSM 816. Master state machine 800 later instructs cipher FSM 814 to fetch command word 602 from SA buffer 222 for pre-loading the appropriate encryption sub-block in cipher block 204.

A read FSM 808 couples to read interface 200 and initiates the reading of the actual packet data from host memory 108 using read data pointer 304. Read FSM 808 also controls the reading of packet data from read interface 200 to IFIFO 208. For example, read FSM 808 assists in controlling the implementation of gather mode reading by read interface 200 when using DMA mode.

An IFIFO FSM 810 is coupled to IFIFO 208 and controls the filling of IFIFO 208 with packet data from read interface 200. IFIFO FSM 810 keeps track of whether IFIFO 208 is full or empty, and if there is at least 64 bytes of available memory in IFIFO 208, then IFIFO FSM 810 requests read FSM 808 to fetch more data. If the last data for a packet has been loaded into IFIFO 208, then read FSM 808 signals this condition to Next FSM 802, which initiates the fetching of a new command as described herein. Read FSM 808 identifies the last data by decrementing the packet byte count received from read interface 200. IFIFO FSM 810 is able to manage multiple packets in IFIFO 208 to support pipelining as described herein.

An input align FSM 812 interfaces with input align/padding block 224 and controls sending of data to cipher block 204. Input align FSM 812 is activated once at least a threshold of, for example, 8 bytes of data are accumulated in IFIFO 208 for the "current" data packet. Input align/padding block 224 reads, for example 8 bytes at a time from IFIFO 208 and sends the bytes to cipher block 204. A skilled artisan will recognize that the byte threshold could be set larger or smaller than 8 bytes in other embodiments.

A cipher FSM 814 interfaces with cipher block 204 and pre-loads encryption data 604 when requested by Next FSM 802 in preparation for the next data packet to be processed in cipher block 204. An SA FSM 816 interfaces to local DMA interface 216 and, under the control of Next FSM 802, requests that SA data be fetched from data cache 114 in preparation for the next data packet. SA FSM 816 generally loads the SA data into SA data buffer 222 and fetches the SA data as needed during processing of a data packet. However, SA FSM 816 directly loads the SA data into cipher block 204 when cipher bus 716 is not busy and the applicable encryption sub-block 702-706 (see FIG. 7) is not busy with another data packet.

Each of FSMs 802-806 is coupled to SA output control unit 214 to permit coordination of processing control for each packet in each processing channel of core 112, as discussed further below. In general, SA output control unit 214 will signal when a data packet is fully processed and completely written out of core 112 so that Previous FSM 806 enters a "next" state to initiate the request of the next data packet.

Now describing the operation of SA input control unit 212 in more detail, each FSM in master state machine 800 is in an idle state after a system reset is done and sends a signal to read interface 200 that it is now free to process a new data packet. Host processor 104 sets a register (not shown) in input control unit 212 that causes a first one of the FSMs to enter a "next" state (described herein as Next FSM 802). Next FSM 802 sends a request to local DMA interface 216 to fetch and put command word 602 from data cache 114 into command buffer 220 and to fetch and put encryption data 604 and authentication data 606 from data cache 114 into data buffer 222.

Next FSM 802 decodes command word 602 and requests that cipher FSM 814 program the appropriate encryption sub-block in cipher block 204. Programming of the sub-block includes loading of, for example, the initialization vector (IV), encryption keys, and state data. At substantially the same time as the appropriate encryption sub-block is being programmed, Next FSM 802 requests that packet data be read into IFIFO 208.

Packet data enters cipher block 204 from input align/padding block 224, which sends a ready signal to cipher FSM 814 when input align/padding block 224 contains a minimum threshold of data, for example 8 bytes, that can be unloaded and the appropriate encryption sub-block has been fully programmed. Upon receipt of the ready signal, Next FSM 802 enters the state of "current" and initiates processing in cipher block 204, which reads, for example, eight bytes of data at a time through a, for example, 64-bit bus from input align/padding block 224. It should be noted that the respective encryption sub-block 702-706 controls the timing of the unloading of data from input align/padding block 224. When Next FSM 802 has entered the "current" state, it is indicated as Current FSM 804 in FIG. 8.

Current FSM 804 controls the filling of IFIFO 208 with data and the initial processing of data in cipher block 204. Current FSM 804 initializes a register (now shown) with the byte count for the second data packet to be loaded, as mentioned above, and decrements this register as the second data packet is loaded. When the byte count reaches zero, then all data for the second packet has been read from IFIFO 208 and will generally be immediately written to cipher block 204. It should be noted that IFIFO is not necessarily empty when the byte count register reaches zero, because Next FSM 802 may have started to load data for a subsequent packet.

While encryption processing is occurring for the first packet, IFIFO FSM 810 is monitoring the byte count register to determine when the last piece of data for the first packet has been loaded into IFIFO 208. Then, a second FSM that was idle from system reset, as mentioned above, enters a "next" state and repeats the sequence of operations described above for Next FSM 802. In other words, the second FSM is activated to fetch the next new command for the next data packet and to begin loading the data for the next data packet into IFIFO 208. The second FSM also programs cipher block 204 unless the prior packet is using the same encryption sub-block in cipher block 204, in which case the second FSM waits until processing for the prior data packet is complete. Because only one master FSM is in a "current" state at any one time, cipher processing for the second data packet will not begin, and the second FSM will not enter a "current" state, until processing is complete for the prior packet (regardless of whether the same or different encryption algorithms will be used on each packet).

Current FSM 804 also monitors the start offsets of the hash and cipher operations in the current data packet being read from input align/padding block 224 to determine which bytes are to be ciphered, which bytes are to be hashed, and which bytes are to be loaded into OFIFO 210. Current FSM 804 also is coupled to input align FSM 810 to control the size of the padding bytes that may be appended before or after the digest, as appropriate for the current security protocol. In addition, current FSM 804 indicates to cipher block 204 if any IV data is to be captured from the data stream, in IPSec inbound mode, or is to be read from randomizer 226 and written to cipher block 204, in IPSec outbound mode.

Once (i) all data for a given packet has been unloaded from clear and cipher registers 708 and 710 in cipher block 204, and (ii) SA output control unit 214 has finished saving any state or IV information as may be required from cipher block 204, then the first FSM that is in a "current" state enters a "previous" state (indicated as Previous FSM 806). At this time, in general, cipher processing is complete and SA input control unit 212 is handing over primary control of processing the data packet to SA output control unit 214. The operation of hash block 206 is controlled by SA output control unit 214 and monitored by Previous FSM 806.

Core 112 implements programmable start addresses and lengths in the data packet for which encryption is done and programmable start addresses and lengths for which hashing is done. The rest of the data in the packet is passed transparently to the destination memory address in host memory 108.

The first FSM entering a "previous" state permits the second FSM to enter a "current" state and now control incoming data in input align/padding block 224. The second FSM waits for a signal from SA output control unit that all data in the prior packet has left cipher block 204, at which time the second FSM enters a "current" state (indicated as Current FSM 804). Once all of the data for the second packet enters IFIFO 208 under control of the second FSM, the third FSM enters a "next" state and fetches a third command for a third data packet. The third FSM then repeats the operations described above for Next FSM 802. Each of the FSMs in master state machine 800 keeps track of the appropriate command in buffers CB1, CB2, and CB3 in command buffer 220 and SA data in buffers SA1, SA2, and SA3 in SA data buffer 222.

Whenever one of master FSMs 802-806 initiates processing of a new data packet in cipher block 204, master state machine 800 sends a signal to SA output control unit 214 and also communicates the command register location in command buffer 220 that corresponds to the data packet being processed in cipher block 204. SA output control unit 214 sends a signal to master state machine 800 when all packet data 502 and status word 504 have been written to host memory 108 so that SA input control unit 212 can allocate the freed registers in SA data buffer 222 and command buffer 220 to another one of master FSMs 802-

806. Upon receiving this signal, Previous FSM 806 enters a "next" state and operates as described above for Next FSM 802.

Variations of the above general operation can be implemented for handling specific security protocols. For example, if core 112 is implementing MAC appending as called for in SSL and/or transport layer security (TLS) version 1.0, then Current FSM 804 will not switch to a "previous" state even though all data has left cipher block 204. Instead, the last portion of current data remaining in IFIFO 208, if the remaining portion of data is less than the block size used by the applicable encryption algorithm (which block size is, for example, 8 bytes for TDEA/DES or 16 bytes for 128-bit AES), of the current data packet will have a MAC appended as initiated by SA output control unit 214. Current FSM 804 will control the completion of the MAC appending, the addition of any required padding, and initiation of additional cipher processing in cipher block 204. The last portion of data when held, when applicable, is stored in a portion of IFIFO 810 that acts as a feedback buffer for this purpose. If no data is held back such as, for example, when using the ARCFOUR streaming algorithm, then the MAC is simply appended and processing done again through cipher block 204.

After appending the MAC, padding is added as may be required to meet the block size requirements for a particular cipher algorithm. It should be noted that no padding is done in the case of a stream cipher. The last portion of data with the appended MAC is sent from IFIFO 208 through input align/padding block 224 to cipher block 204 to be encrypted again as called for in the SSL or TLS protocol. The holding of data in IFIFO 208 for MAC appending as described above assists in implementing the single-pass architecture of cryptographic core 112.

Security Association Output Control Unit

Figure 9:
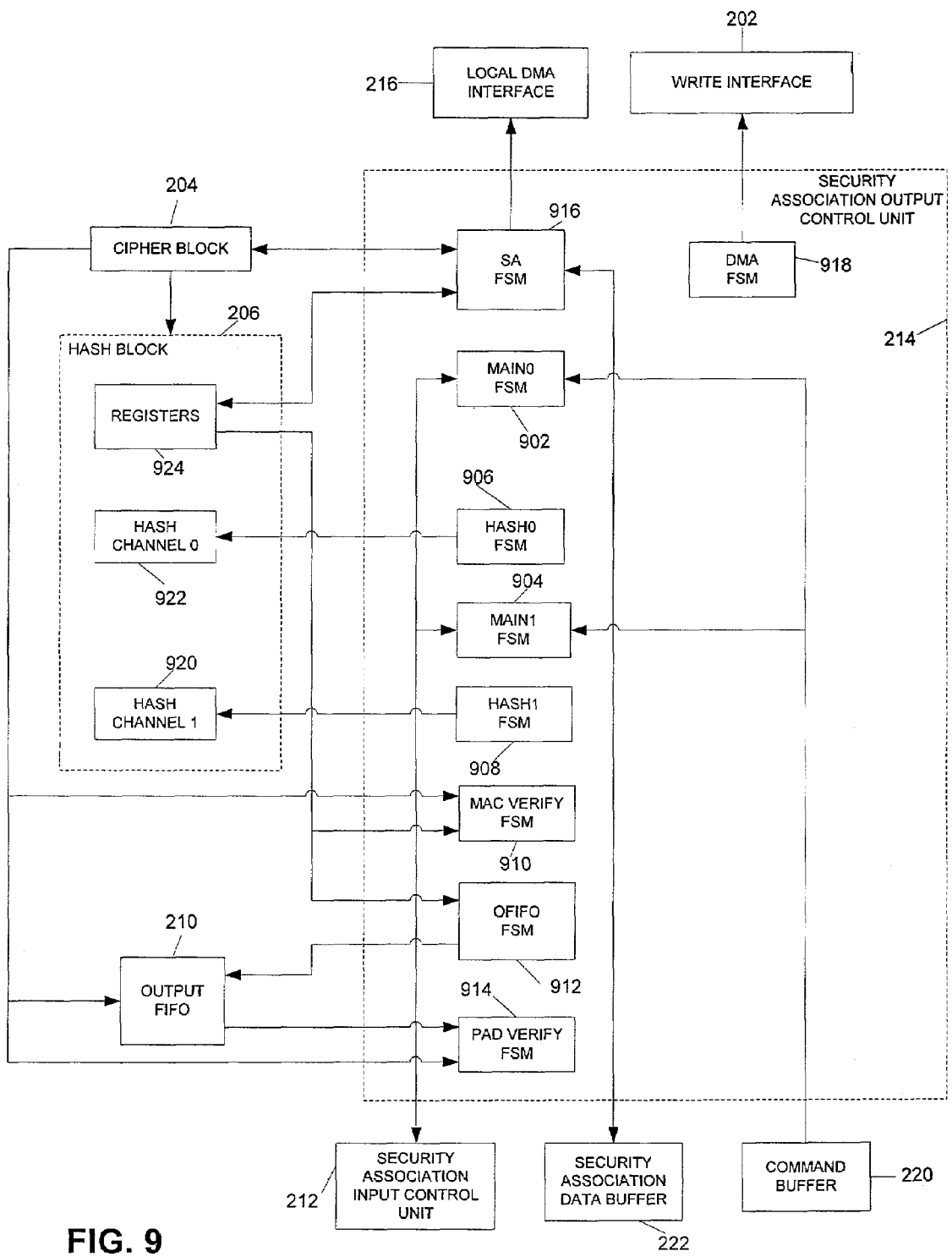
FIG. 9 is a block diagram of an output control unit used in the cryptographic processor of FIG. 2.

FIG. 9 is a block diagram of SA output control unit 214, which generally controls the output side of cryptographic core 112. SA output control unit 214 has a primary pair of FSMs or controllers, MAIN0 FSM 902 and HASH0 FSM 906, for controlling the processing of a data packet in cipher block 204 and hash block 206. A secondary pair of FSMs or controllers, MAIN1 FSM 904 and HASH1 FSM 908, are substantially identical in structure to FSMs 902 and 906 and are also able to control substantially the same operations. However, secondary FSMs 904 and 908 will only control processing for a data packet when primary FSMs 902 and 906 are busy handling processing for a preceding packet in the channel. MAIN0 and MAIN1 FSMs 902 and 904 are coupled to send and receive control signals from SA input control unit 212, and to read command words 602 for the appropriate data packet from command buffer 220. Also, MAIN0 and MAIN1 FSMs 902 and 904 are programmed to keep track of the proper sequence of operations for different security protocols as indicated by command word 602.

A security association FSM 916 reads SA data from SA data buffer 222 and handles the programming of hash block 206 prior to hashing a data packet by loading authentication data 606 into registers 924. SA FSM 916 also controls the fetching of updated SA data from cipher block 204 after a data packet is fully processed in cipher block 204. SA FSM 916 is coupled to local DMA interface 216 for requesting that this updated SA data be written to SA data cache 114 (see FIG. 2). As mentioned above, this SA updating is done, for example, when the command for the just-processed data packet requires that packet-to-packet chaining. For example, the SA output control unit 214 can store IV information in SA data cache 114 when using AES or TDEA/DES algorithms.

As will be discussed later below, hash block 206 has two sub-channels 920 and 922, indicated as HASH CHANNEL 0 and HASH CHANNEL 1, that are used by alternating processing between the two sub-channels, to perform hash operations on data packets for each independent channel of core 112. HASH0 FSM 906 couples to HASH CHANNEL 0 and controls the loading of registers 924. Similarly, HASH1 FSM 908 couples to HASH CHANNEL 1 and controls the loading of registers 924 as appropriate for a different packet being controlled by MAIN1 FSM 904. Also, HASH0 FSM 906 and HASH1 FSM 908 control the reading of the calculated MAC from registers 924 after hash processing is complete for a packet, and further they control the providing of read strobes to cipher block 204 and write strobes to hash block 206 and OFIFO 210 for unloading each data word from clear and cipher registers 708 and 710.

A DMA FSM 918 controls the writing of data for a packet to write interface 202. Data is written as it accumulates in OFIFO 210 and exceeds an arbitrary threshold such as, for example, 64 bytes or when all data for a packet has been accumulated in OFIFO 210. DMA FSM 918 is informed that the end of a data packet has been reached by MAIN FSM 902 or 904, which examines the control word that propagates through the channel pipeline in cipher block 204 to OFIFO 210 with each data word to see if a last word control bit in the control word has been set by SA input control unit 212 to indicate that the corresponding data word is the last word of the data packet.

An OFIFO FSM 912 controls read and write pointers to OFIFO 210 and controls aligning of the data stored in OFIFO 210 to reverse the rotating done prior to cipher processing to restore the data's original alignment. Also, OFIFO FSM 912 handles the aligning and appending of MAC data to the end of outbound data packets that are stored in OFIFO 210 for writing to write interface 202 (see FIG. 2). OFIFO FSM 912 controls the proper placement of the MAC to the packet using SA command word 602. OFIFO FSM 912 also generates write strobes to OFIFO 210 to control writing of data to write interface 210 and assists in controlling the implementation of scatter mode writing when using DMA mode.

A pad verify FSM 914 taps and reads the data passing from cipher block 204 to OFIFO 210 and controls verification that padding bytes in the data on inbound packets are correct. Pad verify FSM 914 is idle for outbound packets.

A MAC verify FSM 910 also taps and reads the data passing from cipher block 204 to OFIFO 210 and controls, for each inbound packet, verification of the MAC for the packet. MAC verify FSM 910 later fetches the digest calculated in hash block 206 for the same data packet and verifies that the calculated digest matches the MAC in the inbound data packet. MAC verify FSM 910 is idle for outbound packets.

Now describing the operation of SA output control unit 214 in more detail, SA input control unit 212 sends a signal to MAIN0 FSM 902, or MAIN1 FSM 904 if FSM 902 is busy, indicating a new command has been loaded into command buffer 220 and identifying the appropriate command buffer register (CB1, CB2, or CB3). This signal is sent just before the data enters cipher block 204 when data is ready to be unloaded from input align/padding block 224. Next, hash block 206 is programmed using command word 602 and authentication data 606 is loaded into registers 924.

MAIN0 FSM 902 waits for data to start leaving cipher block 204 and substantially simultaneously generates a read strobe to unload data from clear and cipher registers 708 and 710 and write strobes to write the data to hash block 206 and OFIFO 210. SA output control unit 214 monitors the number of bytes of data in OFIFO 210 and starts to write packet data to write interface 202 once the number of bytes exceeds an arbitrary threshold such as, for example, 64 bytes, or if the end of the data packet is detected. However, when the end of a data packet is detected, output control unit 214 holds a relatively small final portion of the data packet in OFIFO 210 to permit any ongoing related hash operation to complete in hash block 206.

Once hashing is done, for an outbound packet, output control unit 214 typically appends a MAC to the end of the final portion of the packet. For an inbound packet, MAC verify FSM 910 controls a comparison of the calculated MAC to the MAC arriving in the packet and sets status word 504 to indicate the results of the comparison. Also, pad verification is done as described above. After the foregoing operations, output control unit 214 writes out the remainder of the data packet with any appended MAC or status word 504.

Receipt of status word 504 indicates to host processor 104 that packet processing is complete. MAIN0 FSM 902 sends a signal to SA input control unit 212 that a packet on the output side of core 210 is now out of the channel pipeline so that Previous FSM 806 can enter the state of "next" and load a new command and data packet as described above for Next FSM 802.

An optional aspect of the operation of output control unit 214 is that, if cipher block chaining is used for the current security protocol such as in, for example, SSL TLS mode, then after the packet processing is complete, SA FSM 916 reads the IV or the state of the applicable encryption sub-block and writes it back to SA data cache 114 (see FIG. 2) using local DMA interface 216.

As an example of the type of operational state in which MAIN1 FSM 904 begins to control processing for a data packet, MAIN0 FSM 902 is controlling a first data packet for which cipher processing is completed, but hashing is not yet completed. Typically, at this time, SA input control unit 212 will load a second packet in the pipeline for the single channel into cipher block 204, as was described above. As the second packet is processed in cipher block 204, bytes of data will accumulate in OFIFO 210 and will also start entering hash block 206 if at least one of the three hash storage areas of memory 1010 (see FIG. 10) is free.

When the second packet enters cipher block 204, SA input control unit 212 signals SA output control unit 214 as described above. Because MAIN0 FSM 902 is busy with the first data packet, MAIN1 FSM 904 will control processing of the second data packet on the output side of core 112. Under control of MAIN1 FSM 904, HASH1 FSM 908 will program HASH CHANNEL 1 using the appropriate authentication data 606. Because each independent channel in core 112 follows strict packet pipeline ordering, the first packet to enter the channel will be the first packet to leave core 112. Thus, MAIN1 FSM 904 will wait for MAIN0 FSM 902 to fully write the first packet out of OFIFO 210 to write interface 202 before beginning to write data from the second packet accumulating in OFIFO 210 to write interface 202. This is the case even if all cipher and hash processing is completed for the second packet prior to the first packet. However, MAIN1 FSM 904 will simultaneously write data from cipher block 204 to hash block 206 and OFIFO 210 while waiting for MAIN0 FSM 902 to fully write out the preceding first packet.

Once MAIN0 FSM 902 has fully written the first data packet, then MAIN1 FSM 904 changes state to become the dominant or primary master controlling state machine. At this time, MAIN1 FSM 904 is given access to write interface 202 and can begin writing data under the control of DMA FSM 918. Further, MAIN1 FSM 904 continues to act as the primary master state machine until it finishes writing all data for the second packet. While, MAIN1 FSM 904 is dominant, MAIN0 FSM 902, if not busy, can accept control of a third data packet that has entered cipher block 204 and can simultaneously write data from cipher block 204 to hash block 206 and OFIFO 210 while waiting for MAIN1 FSM 904 to fully write out the preceding second packet. Thus, according to the present invention, SA input control unit 212 and SA output control unit 214 control multiple data packets at various stages in a pipelined manner in core 112.

Hash Block

Figure 10:
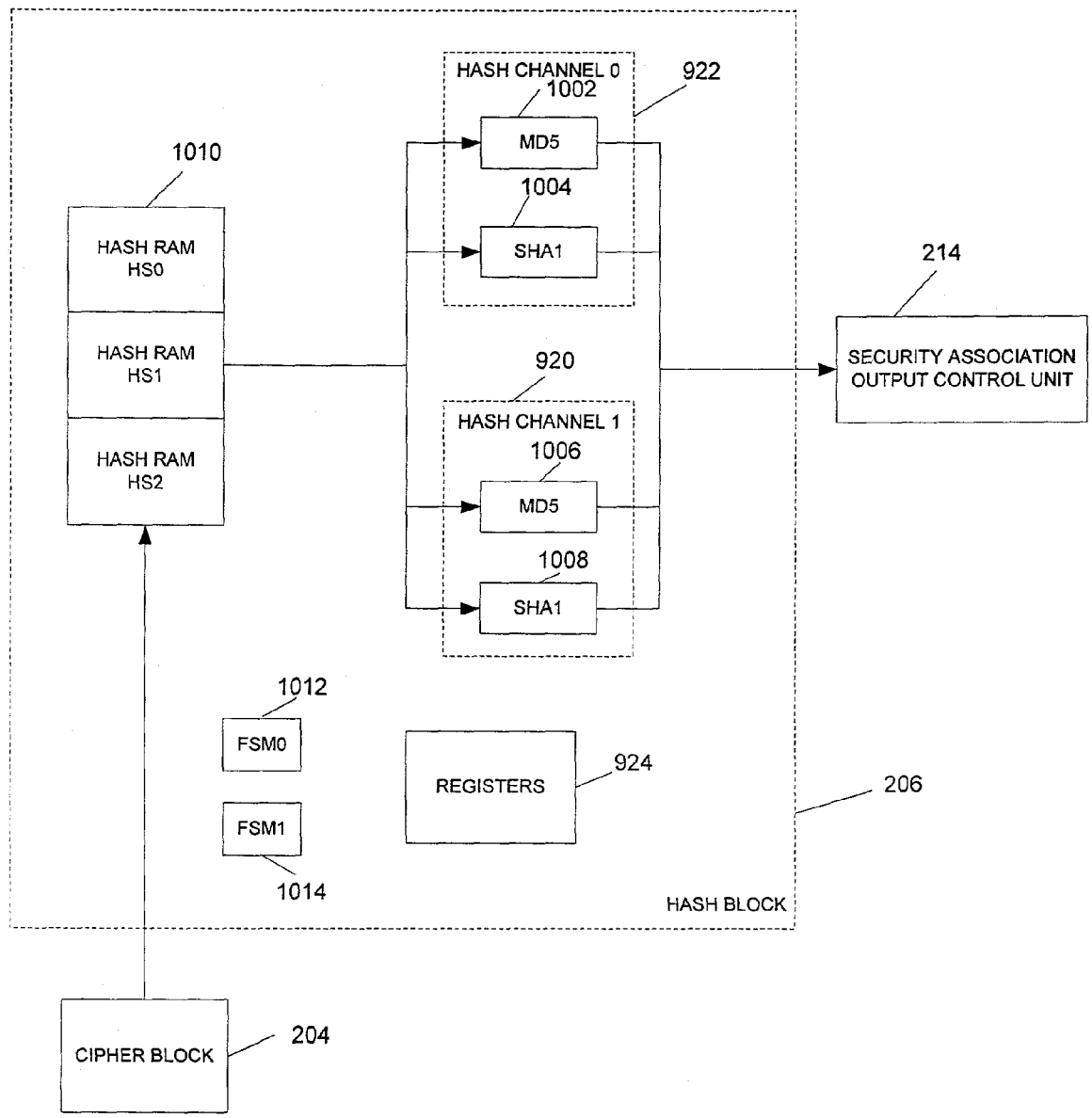
FIG. 10 is a block diagram of a hash block used in the cryptographic processor of FIG. 2.

FIG. 10 is a block diagram of hash block 206, which includes hash sub-channels 922 and 920 (HASH CHANNEL 0 and HASH CHANNEL 1) and registers 924, as mentioned above with reference to FIG. 9. According to the present invention, the use of two hash sub-channels 922 and 920 for each independent IPSec channel of core 112 assists in packet pipelining and enables higher throughput for small packet sizes. Hash sub-channel 922 includes conventional sub-blocks 1002 and 1004 that support standard MD5, SHA1, HMAC MD5, and HMAC SHA1 algorithms. Similarly, hash sub-channel 920 includes conventional sub-blocks 1006 and 1008 that support standard MD5, SHA1, HMAC MD5, and HMAC SHA1 algorithms.

Registers 924 generally store values used in hash processing. For example, certain hash algorithms, such as HMAC pre-processing and pseudo-random function (PRF) involve the calculation of inner and outer digest values, which are reused during hash processing. The inner and outer digest values are stored in registers 924. Also, as each, for example, 64 byte block of data is hashed, registers 924 accumulate the results from each 64 byte block until the full packet is processed. Finite state machines 1012 and 1014 (indicated as FSM0 and FSM1) control, for example, the hashing calculations, padding, and HMAC processing in HASH CHANNELS 0 and 1 and the accessing of data from hash storage areas HS0, HS1, and HS2.

A common hash memory or RAM 1010 has, for example, three hash storage areas identified as HS0, HS1, and HS2, each of which stores, for example, 64 bytes of data and are shared by HASH CHANNELS 0 and 1. Hash memory 1010 receives data from cipher block 204. The cipher data is written to one of the hash storage areas, for example HS0, until it is full. Then, later cipher data fills a next storage area, for example HS1. Next, storage area HS2 is filled, then the foregoing pattern continues to rotate through HS0, HS1, and HS2 during operation. Prior to writing data to hash memory 1010, hash alignment circuitry (not shown) aligns the data from cipher block 204.

When each storage area of hash memory 1010 is full (or the end of a packet is determined by a byte count passed to hash block 206 in a control signal from SA output control unit 214 as determined by the hash starting address offset and hash length in bytes for the packet), its contents is read into hash sub-channel 922 or 920 for hashing. The resulting digest is sent to SA output control unit 214, as mentioned above.

More specifically, HASH CHANNEL 0 and HASH CHANNEL 1 each perform processing on, for example, 64-byte blocks of data corresponding to a single data packet. As discussed above for SA output control unit 214 and FIG. 9, HASH0 FSM 906 controls packet processing for a first data packet and is coupled to control HASH CHANNEL 0 to perform hashing for the first data packet. If data for a second packet fills one of the storage areas of hash memory 1010, then hashing of the second packet will be controlled by HASH1 FSM 908 and the data sent from hash memory 1010 to HASH CHANNEL 1 for processing. If HASH CHANNEL 1 is also busy, then the data for the second packet will wait in hash memory 1010 until one of hash sub-channels 920 or 922 is free. Thus, in general, hash block 206 begins hashing the next packet of data when one of hash sub-channels 922 and 920 is free.

Also, it should be noted that hash block 206 typically uses the hash sub-channels 920 and 922 in an alternating, or ping-pong, manner with each successive data packet in a single EPSec channel using the opposite hash sub-channel of the prior packet. However, if both hash sub-channels were free when data for a new packet is stored in hash memory 1010, then hash processing arbitrarily defaults to HASH CHANNEL 0. Thus, in light of the foregoing discussion and according to the present invention, hash block 206 is able to hash a first data packet and a second data packet, which are in the same independent IPSec channel pipeline, simultaneously.

For some security protocols, a 64-byte block of data will be read from one of the storage areas in hash memory 1010 more than one time to do repeated hash operations in one of hash sub-channels 920 or 922. For example, TLS or IPSec requires an HMAC depending on the byte count of the packet. There also may be a padding and HMAC cycle. Thus, for example, a block of data may be read from hash memory area HS1 three times successively and sent to HASH CHANNEL 1 to calculate a digest.

When the security protocol to be implemented is, for example, the TLS pseudo-random function (PRF) mode, then hash sub-channels 920 and 922 work in tandem to perform MD5 and SHA-1 processing for the first data packet simultaneously. By such tandem operation, hash processing time may be cut roughly in half.

Sub-channels 920 and 922 also may work in tandem to do HMAC pre-processing for a data packet. The inner and outer digests calculated from HMAC pre-processing are saved in registers 924, which may be then saved to SA data cache 114 by SA output control unit 214 for later use in doing HMAC processing as appropriate for given data packet. This pre-processing step saves two hash cycles over 64 bytes, which must be done for every data packet in IPSEC and TLS 1.0 modes. The saved digests are restored to register 924 by SA output control unit 214, during processing of a data packet in IPSEC and TLS 1.0 modes, at the start.

When hashing is complete for a data packet, a hashing complete signal is sent by hash block 206 to SA FSM 916, which then reads the final calculated digest for the packet through a, for example, 64-bit interface from registers 924. Further details regarding examples of a hash circuit suitable for use with the present invention are described in U.S. Provisional Application Ser. No. 60/297,876, filed Jun. 13, 2001 (titled APPARATUS AND METHOD FOR A HASH PROCESSING SYSTEM USING MULTIPLE HASH STORAGE AREAS by Satish N. Anand) and in U.S. Provisional Application Ser. No. 60/340,013, filed Dec. 10, 2001 (titled APPARATUS AND METHOD FOR A HASH PROCESSING SYSTEM USING MULTIPLE HASH STORAGE AREAS by Satish N. Anand), each of which is incorporated by reference herein.

Packet Pipelining and Hash Sub-Channels

Figure 11:
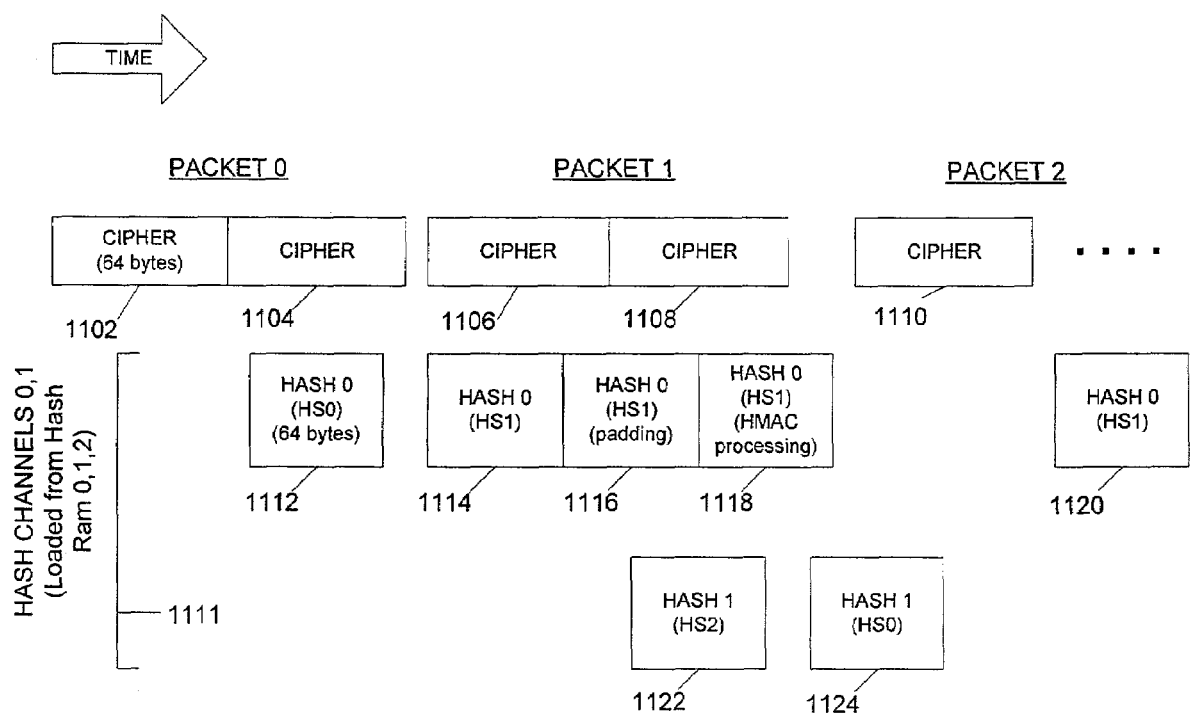
FIG. 11 is a timing diagram illustrating the pipelining of data packets and the use of hashing channels in the cryptographic processor of FIG. 2.

FIG. 11 is a timing diagram illustrating the pipelining of data packets in a single channel in cryptographic core 112 (such as illustrated in FIG. 2) and the use of multiple hashing sub-channels 920 and 922 (indicated by bracket 1111) according to the present invention. Specifically, simplified representations of 64-byte blocks of data corresponding to data packets (packet 0, packet 1, and packet 2) are illustrated in FIG. 11 with the horizontal length of each of many cipher blocks 1102-1110 corresponding to the processing time (the direction of which is indicated by the TIME arrow) to perform cipher operations on a 64-byte block in cipher block 204. Hash block 206 is described herein as having two hash sub-channels 920 and 922; however, a skilled artisan will recognize that more than two sub-channels could be used in other embodiments. Further, packets 0 and 1 are illustrated as containing two 64-byte cipher blocks for purposes of explanation. In actual operation, packets may vary widely in size.

Now describing FIG. 11 in more detail, packet 0 contains cipher data blocks 1102 and 1104. Data block 1102 represents the time required to process this 64 bytes of data in cipher block 204. Similarly, block 1104 represents the time required to process the second 64 bytes of data in cipher block 204. As described above for hash block 206, once block 1102 has completed cipher processing, it enters hash memory 1010 storage area, for example, HS0. It should be noted that filling of hash memory 1010 is done as and when 64-bit blocks of data are processed by cipher block 204. Assuming that HASH CHANNEL 0 is not busy, then the 64 bytes of data enter HASH CHANNEL 0 for hash processing. This is indicated as block 1112 in FIG. 11. In block 1112, "HASH 0" indicates HASH CHANNEL 0 is doing the hashing and "(HS0)" indicates that the data were read from hash memory storage area HS0. While block 1112 is being hashed, block 1104 continues cipher processing.

Once block 1104 completes cipher processing, the data enters the next hash memory 1010 storage area, which is HS1 in this example. Block 1114 corresponds to this data and has the notation "(HS1)" to indicate that the data was read from storage area HS11. Block 1114 also has the notation HASH 0 since all data for a given packet, here packet 0, are processed in the same hash sub-channel. The security protocol for packet 0 calls for padding and HMAC processing operations (such as used in, for example, TLS) in hash block 206, so the second block of 64 bytes are read again from HS1 to perform these additional hash operations in HASH CHANNEL 0 (as indicated by blocks 1116 and 1118).

While block 1114 is being hashed, cipher block 204 has completed cipher processing on packet 0 and has received data for block 1106 of packet 1 and begun cipher processing. Once block 1106 is done with cipher processing, the data is written to the next hash memory storage area in rotational order, which is HS2 in this example, and indicated in FIG. 11 as block 1122. Because successive data packets are typically processed using alternating hash sub-channels 920 and 922, and in this example HASH CHANNEL 0 was used for packet 0, packet 1 is processed in HASH CHANNEL 1 (indicated as "HASH 1" in block 1122).

While block 1122 is hashed, second data block 1108 of packet 1 is cipher processed. Once block 1108 completes cipher processing, then the data is written to the next storage area in round-robin order as discussed above, which in this example is HS0, and indicated as block 1124 in FIG. 11. HASH CHANNEL 1 is used to process block 1124 since this data is in packet 1, which is being processed through HASH CHANNEL 1.

The next data packet, packet 2, has had some data written to IFIFO 208 as discussed above as part of pipelining; however, block 1110 of packet 2 does not enter cipher block 204 until one of hash sub-channels 920 and 922 is free. Thus, once block 1118 completes processing, then block 1110 begins cipher processing. When block 1110 is complete, and the data is written to the next hash memory storage area, which is HS1 in this example (and indicated as block 1120 in FIG. 11), hash processing starts by HASH CHANNEL 0. Both HASH CHANNEL 0 and HASH CHANNEL 1 are free when block 1110 is ready for hashing, and packet 2 enters HASH CHANNEL 0 since HASH CHANNEL 0 has been arbitrarily selected as the default channel as mentioned above. While and after block 1120 is being hashed, additional data blocks (not shown) may continue to enter cipher block 204 as the above pipelining continues in a similar manner for processing additional data blocks and packets.

By the foregoing description, a novel single-pass cryptographic processing system and method have been disclosed. The present invention provides a cryptographic processor that uses multiple independent packet processing channels, supports both the IPSec, TLS/SSL protocols, and the most common encryption and hash algorithms on the same chip, and supports packet pipelining for efficient use of the processor. The processor according to the present invention provides local access to security association data to better use the bus bandwidth between the host processor and the cryptographic processor. Also, the processor recognizes the security protocol associated with incoming data packets and automatically locally configures itself for protocol-specific operations on the processor chip without the need for intervention by the host processor. Additionally, the processor according to the present invention reduces local memory bottlenecks associated with existing single memory designs. The processor achieves the foregoing advantages while providing improved network transparency, maintaining optical-data line transmission rates, and exhibiting improved scalability and compatibility with evolving fiber optic security standards.

In addition, the present invention has the further advantage of being readily scalable in that two or more cryptographic cores 112 each sharing read/write interface 110 can be used to support a greater number of channels in cryptographic processor 102.

As mentioned above, local DMA interface 216 enables relatively quick fetching of SA data instead of using host bus 106 bandwidth. Typically, the SA data size is greater than the data packet size, thus the bandwidth requirements of host bus 106 are greatly reduced.

Each of encryption sub-blocks 702-706 uses the same external interface to cipher block 204 so that encryption sub-blocks can be readily added or removed. The use of two or more hash sub-channels in hash block 206 for each IPSec channel enables cipher block 204 to start processing a second packet and simultaneously start hashing of the second packet even while a first packet is completing hashing. Thus, throughput of core 112 is significantly increased by roughly doubling the gate count of hash block 206 rather than the blocks for the entire channel.

The sharing of common hash memory 1010 by hash sub-channels 920 and 922 enables hash block 206 to support iterative hashing as required for implementation of the PRF in TLS 1.0 and SSL 3.0. The three-stage pipelining in each channel substantially ensures that the gate-intensive cipher block 204 and hash block 206 are typically substantially always processing data.

Core 112 is packet intelligent and can distinguish, for example, between IPSec encapsulation security protocol (ESP) or IPSec authentication header (AH) data packets and TLS 1.0 or SSL 3.0 data packets, both for inbound and outbound packets. Core 112 automatically inserts cipher block padding and MAC appending for outbound data packets in conformance to EPSec and SSL standards. Core 112 also automatically deletes cipher block padding, the MAC and the outer header for inbound data packets.

Processing in core 112 is done substantially in a single-pass through core 112. For example, IPSec and SSL processing is done without having to store a data packet, determine the pad length at the end of the packet, and then do packet processing. Cryptographic processor 102 enables processing at significantly increased data rates. For example, it is believed that a single core 112 could support a two and a half gigabit per second or greater rate. Core 112 may be manufactured in a single integrated circuit using, for example, standard ASIC cell libraries.

The types of products in which cryptographic processor 102 and cryptographic processing system 100 may be advantageously used include, for example, routers requiring virtual private network (VPN) support for customer premise's equipment and Internet service provider (ISP) equipment, access concentrators in ISP and data-processing centers to provide VPN services to users for remote access and in extranets, and data centers providing SSL/TLS accelerators for accelerating e-commerce over the Internet.

Although specific embodiments have been described above, it will be appreciated that numerous modifications and substitutions of the invention may be made. For example, the present invention may include new cipher blocks such as skipjack, and new hash algorithms such as SHA-192, SHA-256, or SHA-512. Also, although data is often described herein as being processed in 64-bit blocks, a skilled artisan will recognize that in other designs according to the present invention a larger or smaller block size could be used.

In addition, the number of channels in core 112 could be increased or decreased. Variations can also be made in the number of stages in each pipelined channel and/or in the specific architecture for cipher encryption sub-blocks. Further, other types of security algorithms could be added or substituted for those described above. Moreover, as mentioned above, several similar or identical cores 112 could be coupled to a common read/write interface 110 to achieve ready scalability of the cryptographic processing system 100 to an 8, 16, or 32 channel system. Accordingly, the invention has been described by way of illustration rather than limitation.

What is claimed is:

1. A cryptographic processing system, comprising:
a cipher circuit coupled for receiving incoming data and adapted to process the incoming data using at least two different encryption algorithms;
a hash circuit coupled to receive data from the cipher circuit, the hash circuit comprising at least two hashing sub-channels and adapted to process data using m least two different hash algorithms;

a clear register coupled to an output side of the cipher circuit for storing data passed through the cipher circuit without encryption by the cipher circuit;
a cipher register coupled to the output side of the cipher circuit;
an input control circuit coupled to control the cipher circuit and configured to selectively couple the clear register or the cipher register to the hash circuit; and an output control circuit coupled to control the hash circuit, wherein the input control circuit and output control circuit cooperate to coordinate cipher and/or hash operations on each of a plurality of data packets processed by the processing system.

2. The processing system of claim 1 wherein the input control circuit comprises a plurality of state machines for controlling pipeline processing of the plurality of data packets.

3. The processing system of claim 2 wherein:
each of the plurality of state machines operates in states corresponding to precious, current, and next states that each correspond to the extent of processing of the incoming data by the processing system, wherein each of the plurality of state machines is configured to switch from the current state to the previous state as the incoming data is processed by the cipher circuit;
processing of the data packet in the cipher circuit is controlled by a state machine of the plurality of state machines operating in the current state, wherein the state machine switches to the previous state after the processing of the data packet in the cipher circuit is complete; and
the state machine that switched to the previous state switches to the next state after the processing system has completed processing of the data packet.

4. The processing system of claim 1 further comprising a security association data buffer, coupled to the input control circuit and the output control circuit, for storing security association data.

5. The processing system of claim 4 further comprising an interface for receiving the security association data from an off-chip security association data cache.

6. The processing system of claim 4 further comprising a security association data cache, coupled to provide security association data to the security association data buffer, for storing security association data for at least two different security protocols.

7. The processing system of claim 6 wherein the processing system is configured to read cipher information from the cipher circuit after cipher processing of a portion of the incoming data in the cipher circuit and to store the cipher information in the security association data cache.

8. The processing system of claim 6 wherein the security association data cache comprises a on-chip data cache on the same chip as the processing system and an off-chip data cache on a different chip than the processing system.

9. The processing system of claim 7 wherein:
the cipher information comprises initialization vector or state information; and
the processing system is configured to later read the cipher information from the security association data cache and to restore the cipher information to the cipher circuit for use in additional encryption processing by the cipher circuit.

10. The processing system of claim 1 further comprising: an output memory coupled to receive data from the cipher circuit; and wherein:
the processing system is configured to selectively send data Stored in the clear register to either the bash circuit or to the output memory.

11. The processing system of claim 10 wherein the selective sending of data stored in the clear register is performed on a byte-by-byte basis.

12. The processing system of claim 1 wherein each of the two hashing sub-channels is configured to process data using a secure hash algorithm and a message digest algorithm.

13. The processing system of claim 12 wherein the secure hash algorithm is the SHA1 algorithm and the message digest algorithm is the MD5 algorithm.

14. The processing system of claim 1 wherein the hash circuit further comprises a common hash memory, having at least two storage areas, coupled to receive the data from the cipher circuit and to provide the data to the hashing sub-channels for hash processing.

15. The processing system of claim 1 further comprising:
an output memory coupled to receive data from the cipher circuit; and wherein the processing system is further configured to selectively couple the clear register or the cipher register to the output memory.

16. The processing system of claim 15 wherein the output memory is a FIFO buffer.

17. The processing system of claim 15 wherein the output control circuit is coupled to control the output memory.

18. The processing system of claim 17 further comprising an input align/padding circuit coupled between the input memory and the cipher circuit.

19. The processing system of claim 1 wherein the output control circuit is adapted to control the timing of the unloading of data from the clear register and the cipher register.

20. The processing system of claim 1 further comprising:
an input memory coupled to store the incoming data; and wherein the input control circuit is coupled to control the input memory.

21. The processing system of claim 4 further comprising:
a command buffer, coupled to the input control circuit and the output control circuit, for storing a plurality of commands each corresponding to a type of cryptographic processing to be performed in the processing system; and
wherein the input control circuit and the output control circuit are configured to read the plurality of commands from the command buffer.

22. The processing system of claim 21 wherein the command buffer is configured to store a command for each of the number of pipelined stages of processing that the processing system is configured to handle.

23. The processing system of claim 21 wherein:
the input control circuit is configured to program the cipher circuit using a first command of the plurality of commands for processing a first data packet in the cipher circuit; and
the output control circuit is configured to program the hash circuit using the first command for processing the first data packet in the hash circuit.

24. The processing system of claim 23 wherein the input control circuit is configured to request incoming data for a second data packet during the processing of the first data packet in the cipher circuit.

25. The processing system of claim 24 further comprising: an output memory coupled to receive data flora the cipher circuit; and wherein the input control circuit does not request the incoming data for the second data packet until the output control circuit signals that a previous data packet has been fully written out of the output memory.

26. The processing system of claim 25 wherein the output control circuit is configured to append a status word to outgoing data packets.

27. The processing system of claim 26 wherein the status word comprises a hash digest.

28. The processing system of claim 23 further comprising a randomizer coupled to provide a random number to the processing system for programming the cipher circuit in preparation for encryption processing.

29. The processing system of claim 1 further comprising:
a read interface coupled to the cipher circuit;
a host memory, coupled to the read interface, for providing the incoming data to the cipher circuit and receiving processed data from the cipher circuit; and
a host processor, coupled to the read interface, configured to send a processing command to the input control circuit to initiate the sending of the incoming data from the host memory to the cipher circuit.

30. The processing system of claim 29 further comprising a security association data cache for storing security association data for at least two different security protocols and coupled for providing the security association data to the cipher circuit.

31. The processing system of claim 1 further comprising:
an input memory, coupled to an input of the cipher circuit, to store the incoming data wherein the input control circuit is coupled to control the transfer of the incoming data from the input memory to the cipher circuit; and
wherein: (i) the hash circuit is configured to calculate a message authentication code corresponding to a data packet of the plurality of data packets; and
(ii) the processing system is configured to hold a last portion of the data packet in the input memory and to append the message authentication code to the last portion of the data packet for processing in the cipher circuit.

32. The processing system of claim 31 wherein the output control circuit initiates the appending of the message authentication code to the last portion of the data packet.

33. The processing system of claim 31 wherein a portion of the input memory is configured to act as a feedback buffer for holding the last portion of the data packet.

34. The processing system of claim 31 wherein the processing in the cipher circuit of the data packet having the message authentication code appended is done to implement the transport layer security or secure sockets layer protocols.

35. The processing system of claim 31 further comprising an input align/padding circuit coupled between the input memory and the input of the cipher circuit.

36. The processing system of claim 31 wherein:
the input control circuit comprises a plurality of state machines operating in states corresponding to previous, current, and next states, wherein each of the plurality of state machines is configured to switch from the current state to the previous stare as the incoming data is processed by the cipher circuit;
processing of the data packet having the message authentication code appended is controlled by a state machine of the input control circuit operating in the current state; and the state machine operating in the current state does not switch to the previous state until after the last portion of the data packet having the message authentication code appended has completed processing in the cipher circuit.

37. A cryptographic processing system, comprising:
a cipher circuit coupled for receiving incoming data; a clear register and a cipher register coupled to an output side of the cipher circuit; a hash circuit coupled to receive data from the cipher circuit; an output memory coupled to receive data from the cipher circuit; and wherein:
(i) the processing system performs cipher and hash operations on each of a plurality of data packets;
(ii) the clear register stores data passed through the cipher circuit without encryption processing by the cipher circuit; and
(iii) the processing system is configured to selectively send data stored in the clear register to either the hash circuit or to the output memory; and
(iv) the processing system is further configured to selectively send data stored in the cipher register to either the hash circuit or to the output memory.

38. The processing system of claim 37 further comprising a first multiplexer coupled between the clear register and the hash circuit and between the cipher register and the hash circuit for selecting data from the clear register or the cipher register to send to the hash circuit.

39. The processing system of claim 38 further comprising a second multiplexer coupled between the dear register and the output memory and between the cipher register and the output memory for selecting data from the clear register or the cipher register to send to the output memory.

40. The processing system of claim 37 wherein the selective sending of data stored in the clear register is performed on a byte-by-byte basis.

41. The processing system of claim 37 wherein the hash circuit comprises at least two hashing sub-channels.

42. The processing system of claim 41 wherein the hash circuit further comprises a common hash memory, having at least two storage areas, coupled to receive the data from the cipher circuit and to provide the data to the hashing sub-channels for hash processing.

43. The processing system of claim 37 further comprising a security association data cache, for storing security association data for at least two different security protocols, coupled to provide security association data to the cipher circuit and the hash circuit in preparation for cipher and hash processing.

44. The processing system of claim 43 further comprising:
a command buffer for storing a plurality of commands each corresponding to a type of cryptographic processing to be performed for a data packet in the processing system; and
wherein the processing system is configured to read the plurality of command from the command buffer for programming the cipher circuit and hash circuit in preparation for the cipher and hash processing.

45. A cipher circuit for handling encryption processing for a plurality of incoming data packets, comprising:
a common input interface for receiving the incoming data packets, the common input interface comprising a bus using time division multiplexing; and
a plurality of encryption processing circuits, each having an input coupled to the common input interface:
a clear register for storing clear data; a cipher register for storing cipher data a common output interface coupled to the clear register and the cipher register, wherein:
(i) each of the plurality of encryption processing circuits is configured to implement an encryption algorithm;
(ii) at least two of the plurality of encryption processing circuits implement different encryption algorithms; and (iii) the cipher circuit is configured to receive a command used to route each of the incoming data packets to one of the plurality of encryption processing circuits appropriate for the encryption processing corresponding to the incoming data packet.

46. The cipher circuit of claim 45 wherein the common input interface is coupled to each of the plurality of encryption processing circuits using a common set of input signals.

47. The cipher circuit of claim 45 wherein the common output interface is coupled to each of the plurality of encryption processing circuits using a common set of output signals.

48. The cipher circuit of claim 45 wherein the clear register and cipher register are each coupled to a multiplexer for selecting the clear data or the cipher data for outputting to a hash circuit.

49. The cipher circuit of claim 45 wherein the command comprises a pointer to security association data.

50. A cipher circuit for handling encryption processing for a plurality of data packets, comprising:
   an input interface for receiving the data packets;
   an output interface; and
   an encryption processing circuit having an input coupled to the input interface, wherein the encryption processing circuit comprises a clear data pipeline and a cipher data pipeline so that clear data and cipher data corresponding to each of the data packets moves substantially in tandem through the encryption processing circuit, the cipher circuit is configured to output the clear data and cipher data in the same clock cycle, and
   the clear data and the cipher data are available for outputting from the output interface at substantially the same time.

51. The cipher circuit of claim 50 wherein: the clear data is stored in a clear register; and the cipher data is stored in a cipher register.

52. The cipher circuit of claim 51 wherein the clear register and the cipher register axe coupled to a multiplexer for selecting the clear data or the cipher data for outputting from the cipher circuit for hash processing.

53. A cryptographic processing system, comprising: a cipher circuit coupled for receiving incoming data;
   a hash circuit coupled to receive data from the cipher circuit, wherein the hash circuit comprises a first hash sub-channel and a second hash sub-channel;
   a common hash memory wherein the first hash sub-channel and the second hash sub-channel are each coupled to receive data for hash processing from the common hash memory; and
   a control circuit coupled to control the hash circuit, wherein the processing system performs hash operations in the hash circuit on a plurality of data packets corresponding to the incoming data, wherein:
   the control circuit comprises a first controller and a second controller, the first controller is coupled to control the first hash sub-channel; and the second controller is coupled to control the second hash sub-channel, wherein:
   each of the processing channels handles cryptographic processing for one or more data packets independently of the other channels and wherein the hash circuit handles hash processing for one of the processing channels; and
   wherein the first hash sub-channel and the second hash sub-channel are each configured to perform hash operations using at least two different hash algorithms.

54. The processing system of claim 53 wherein the at least two different hash algorithms comprise a secure hash algorithm and a message digest algorithm.

55. The processing system of claim 54 wherein the secure hash algorithm is the SHA1 algorithm and the message digest algorithm is the MD5 algorithm.

56. The processing system of claim 53 wherein the common hash memory comprises at least two storage areas.

57. The processing system of claim 56 wherein the common hash memory is configured to receive and store data from the cipher circuit into a first storage area of the at least two storage areas.

58. The processing system of claim 57 wherein the common hash memory is configured to receive and store data from the cipher circuit into a second storage area of the at least two storage areas while data stored in the first storage area is being hashed.

59. The processing system of claim 57 wherein the data stored in the first storage area and the data stored in the second storage area each correspond to a common data packet.

* * * * *